United States Patent
Frisch et al.

(10) Patent No.: US 10,408,037 B2
(45) Date of Patent: *Sep. 10, 2019

(54) USING AMPLITUDE RATIO CURVES TO EVALUATE CEMENT SHEATH BONDING IN MULTI-STRING DOWNHOLE ENVIRONMENTS

(71) Applicant: HALLIBURTON ENERGY SERVICES, INC., Houston, TX (US)

(72) Inventors: Gary James Frisch, Houston, TX (US); Philip Edmund Fox, Covington, LA (US)

(73) Assignee: Halliburton Energy Services, Inc., Houston, TX (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/515,786

(22) PCT Filed: Oct. 31, 2014

(86) PCT No.: PCT/US2014/063489
§ 371 (c)(1),
(2) Date: Mar. 30, 2017

(87) PCT Pub. No.: WO2016/069002
PCT Pub. Date: May 6, 2016

(65) Prior Publication Data
US 2017/0248003 A1  Aug. 31, 2017

(51) Int. Cl.
*G01V 1/50* (2006.01)
*E21B 47/00* (2012.01)

(52) U.S. Cl.
CPC ............ *E21B 47/0005* (2013.01); *G01V 1/50* (2013.01)

(58) Field of Classification Search
CPC ............................ G01V 1/50; E21B 47/0005
(Continued)

(56) References Cited

U.S. PATENT DOCUMENTS 3,909,775 A * 9/1975 Lavigne .................. G01V 1/46
181/105
4,255,798 A * 3/1981 Havira ................ E21B 47/0005
181/105

(Continued)

FOREIGN PATENT DOCUMENTS

WO  2016/003549  1/2016
WO  2016/069000  5/2016

OTHER PUBLICATIONS

European Search Report for Application No. 14905204.5 dated Apr. 20, 2018.

(Continued)

*Primary Examiner* — Ian J Lobo
(74) *Attorney, Agent, or Firm* — Benjamin Fite; C. Tumey Law Group PLLC

(57) ABSTRACT

A method for evaluating a cement sheath in a wellbore, in some embodiments, comprises transmitting sonic or ultrasonic waves from a logging tool disposed in a wellbore, receiving reflected waves at the logging tool and recording waveforms based on the received waves, processing the waveforms to determine average absolute value amplitude data for each of a plurality of zones, and determining a number using average absolute value amplitude data for a first of the plurality of zones and average absolute value amplitude data for a second of the plurality of zones.

17 Claims, 20 Drawing Sheets

(58) Field of Classification Search
USPC .......................................................... 367/35
See application file for complete search history.

(56) References Cited

U.S. PATENT DOCUMENTS

| | | | |
|---|---|---|---|
| 4,896,303 | A | 1/1990 | Leslie et al. |
| 5,089,989 | A | 2/1992 | Schmidt et al. |
| 5,216,638 | A * | 6/1993 | Wright ................ E21B 47/0005 367/30 |
| 6,041,861 | A | 3/2000 | Mandal |
| 10,221,673 | B2 * | 3/2019 | Frisch ...................... G01V 1/50 |
| 2007/0019506 | A1 | 1/2007 | Mandal et al. |
| 2008/0112262 | A1 | 5/2008 | Tang et al. |
| 2012/0075953 | A1 | 3/2012 | Chace et al. |
| 2012/0075973 | A1 | 3/2012 | Kosaka |
| 2014/0056101 | A1 | 2/2014 | Vu et al. |
| 2015/0369939 | A1 * | 12/2015 | Pistre ....................... G01V 1/50 367/35 |

OTHER PUBLICATIONS

PCT International Search Report and Written Opinion, dated Jul. 15, 2015, Appl No. PCT/US2014/063483, "Peak Analysis of Multi-Directional Sonic and Ultrasonic Waveforms for Cement Bond Logging," Filed Oct. 31, 2014, 11 pgs.

PCT International Search Report and Written Opinion, dated Jul. 15, 2015, Appl No. PCT/US2014/063489, "Using Amplitude Ratio Curves to Evaluate Cement Sheath Bonding in Multi-String Downhole Environments," Filed Oct. 31, 2014, 11 pgs.

Frisch, Gary J. et al., "Assessment of Foamed-Cement Slurries Using Conventional Cement Evaluation Logs and Improved Interpretation Methods," SPE 55649, 1999, 10 pp.

Frisch, Gary J., et al., "Advances in Cement Evaluation Tools and Processing Methods Allow Improved Interpretation of Complex Cements," SPE-97186-MS, SPE Annual Technical Conference and Exhibition, Oct. 9-12, 2005, Dallas, Texas.

* cited by examiner

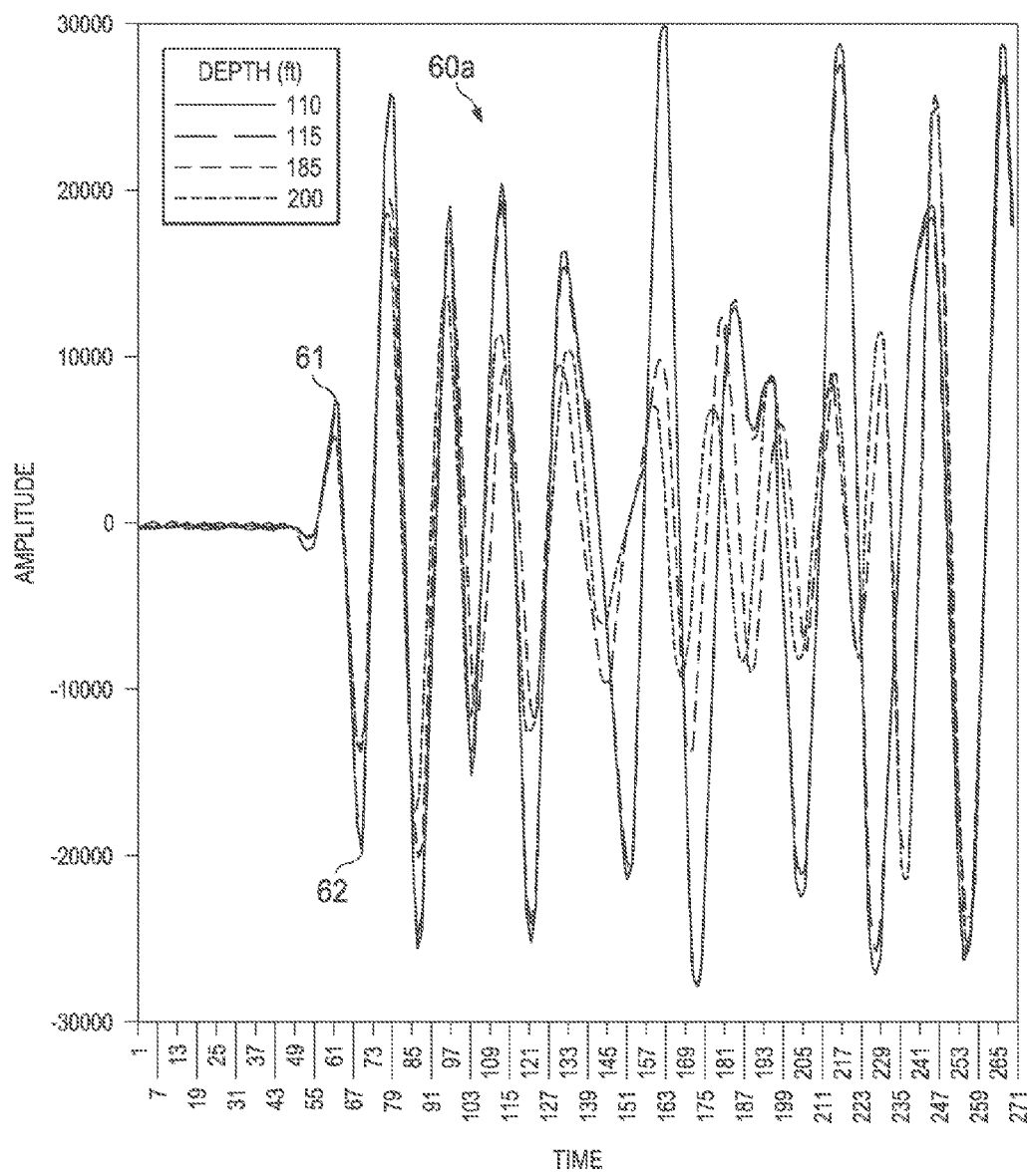

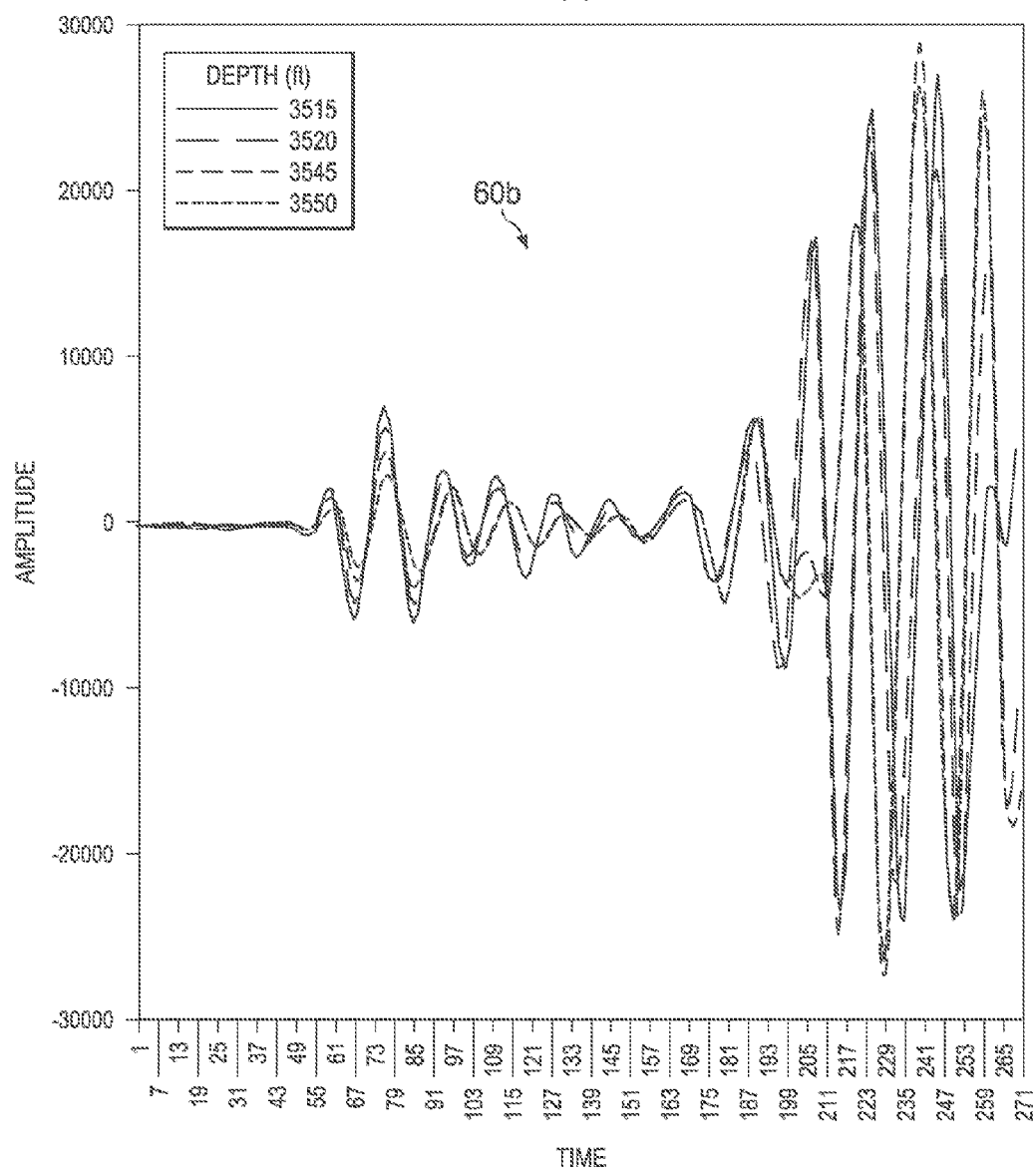

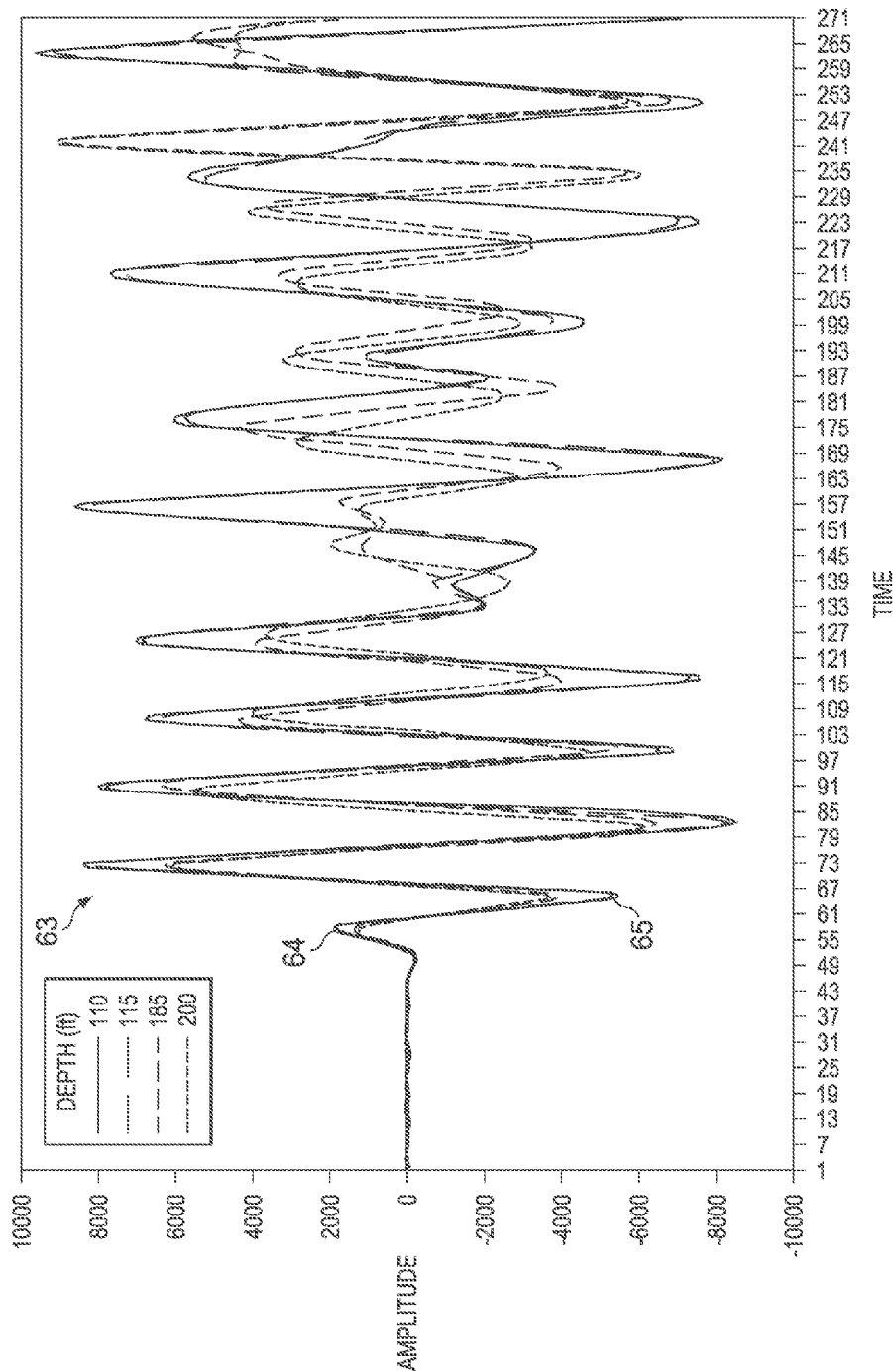

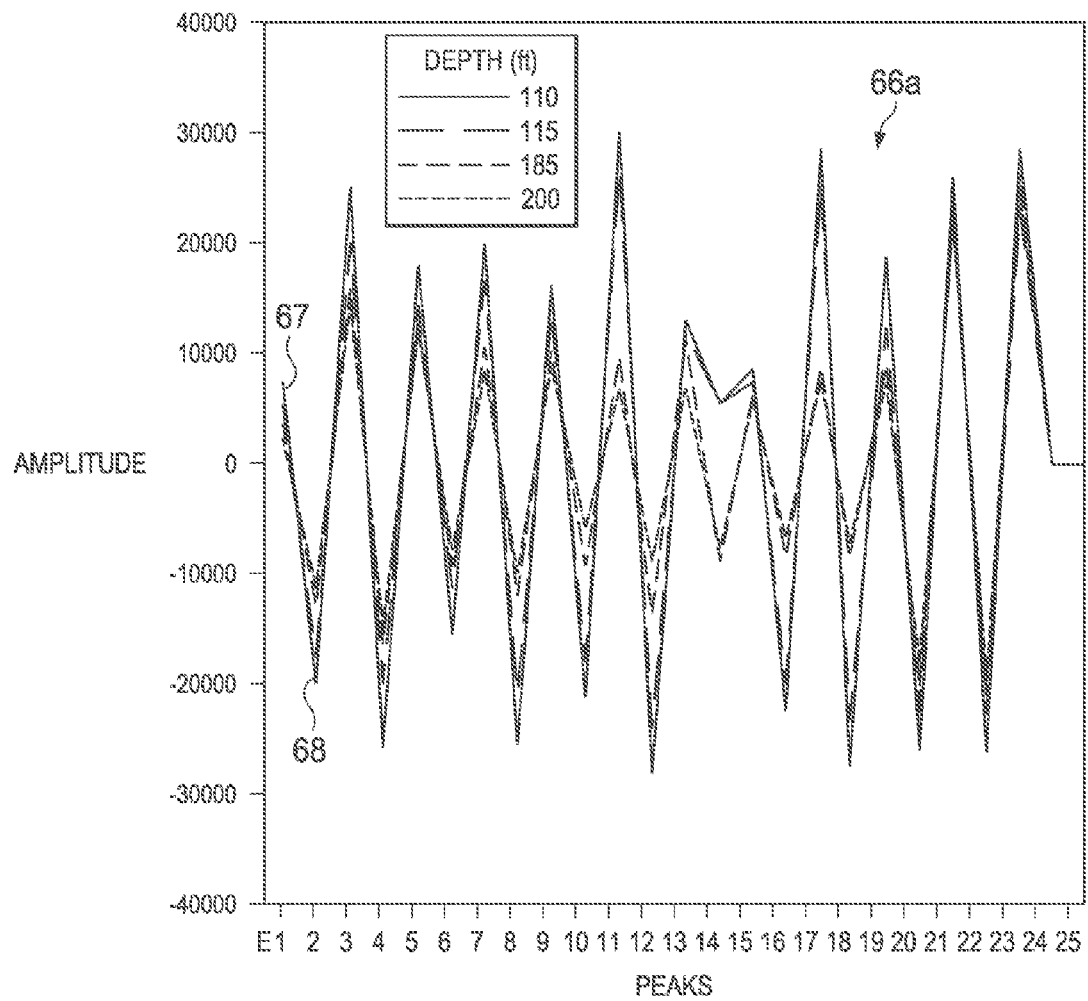

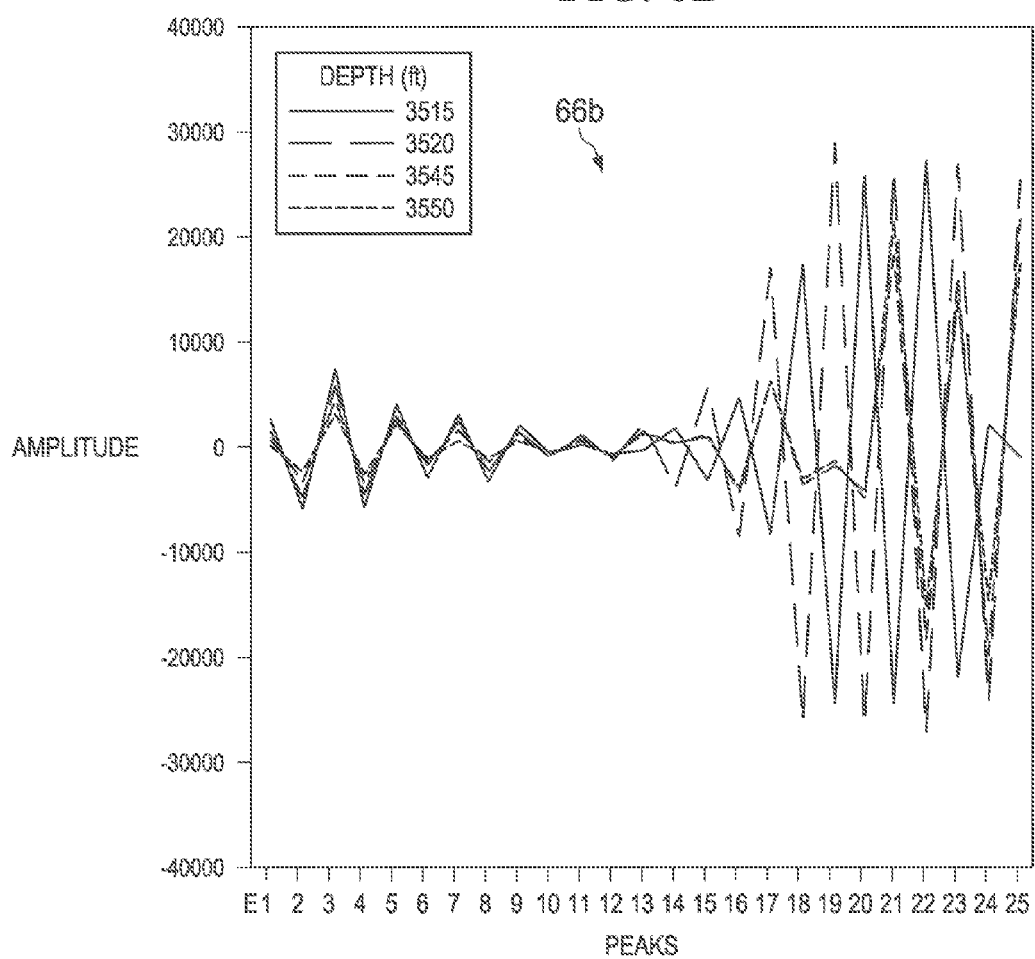

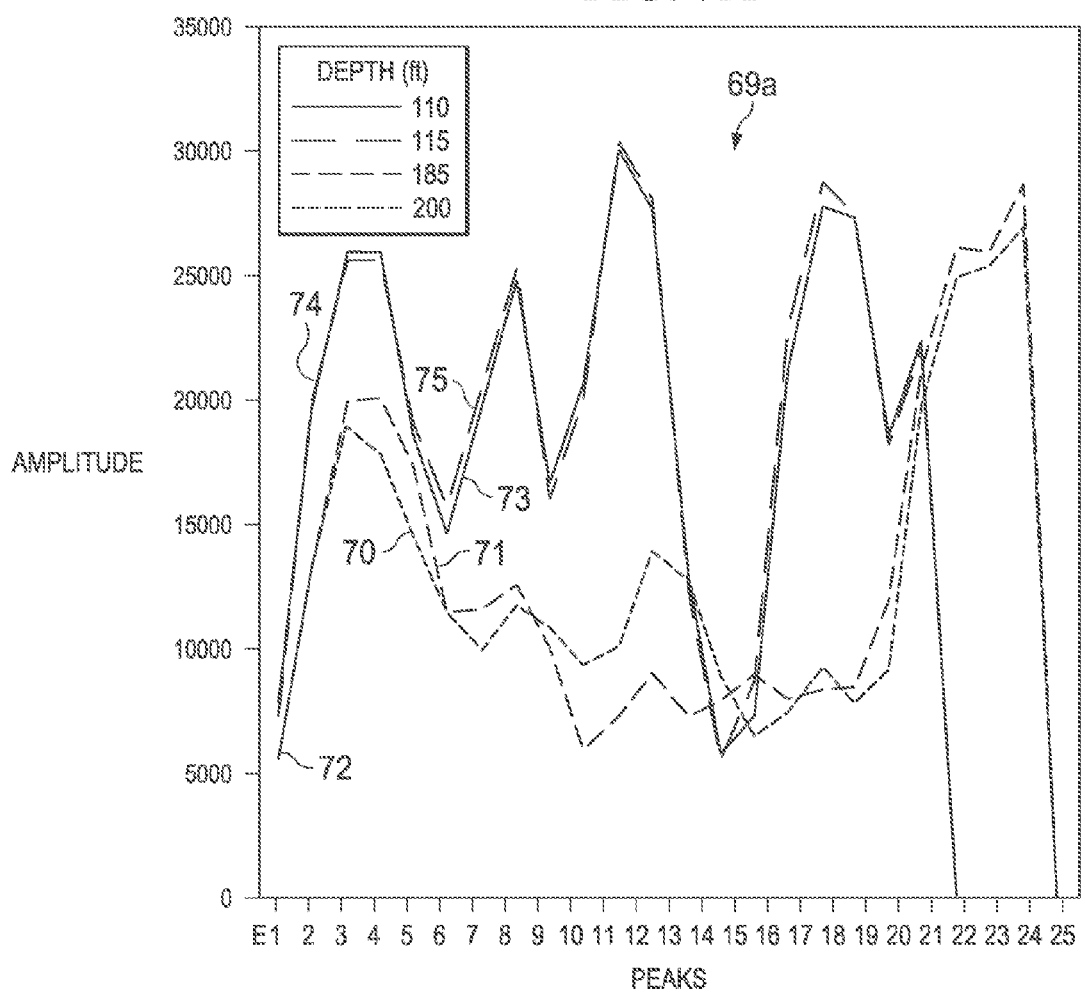

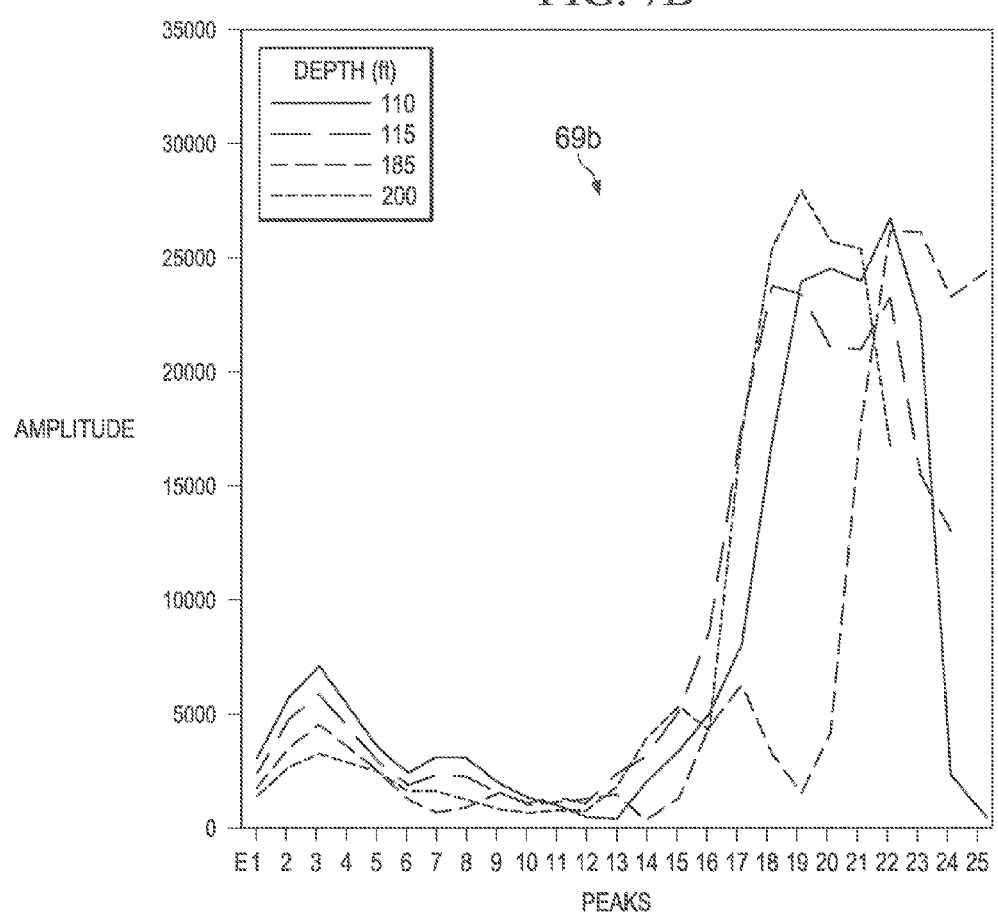

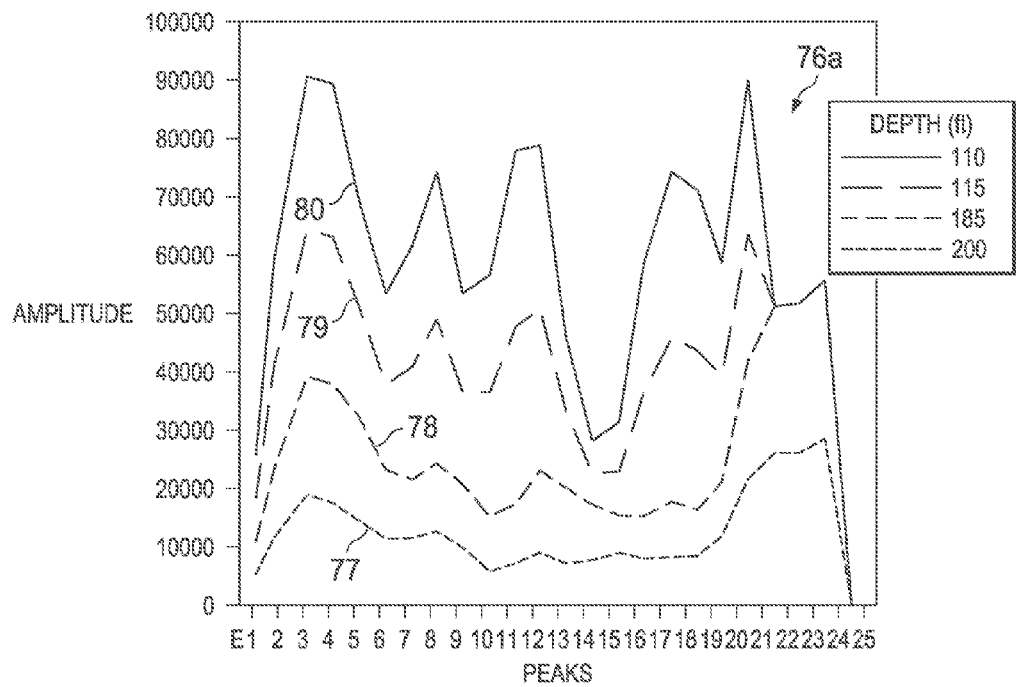
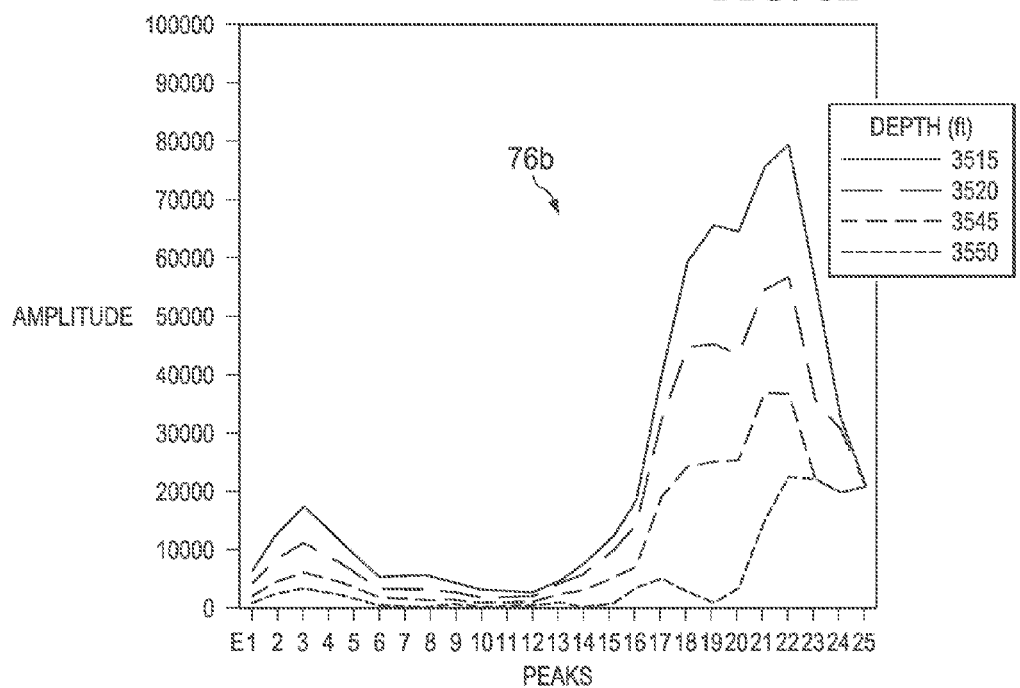

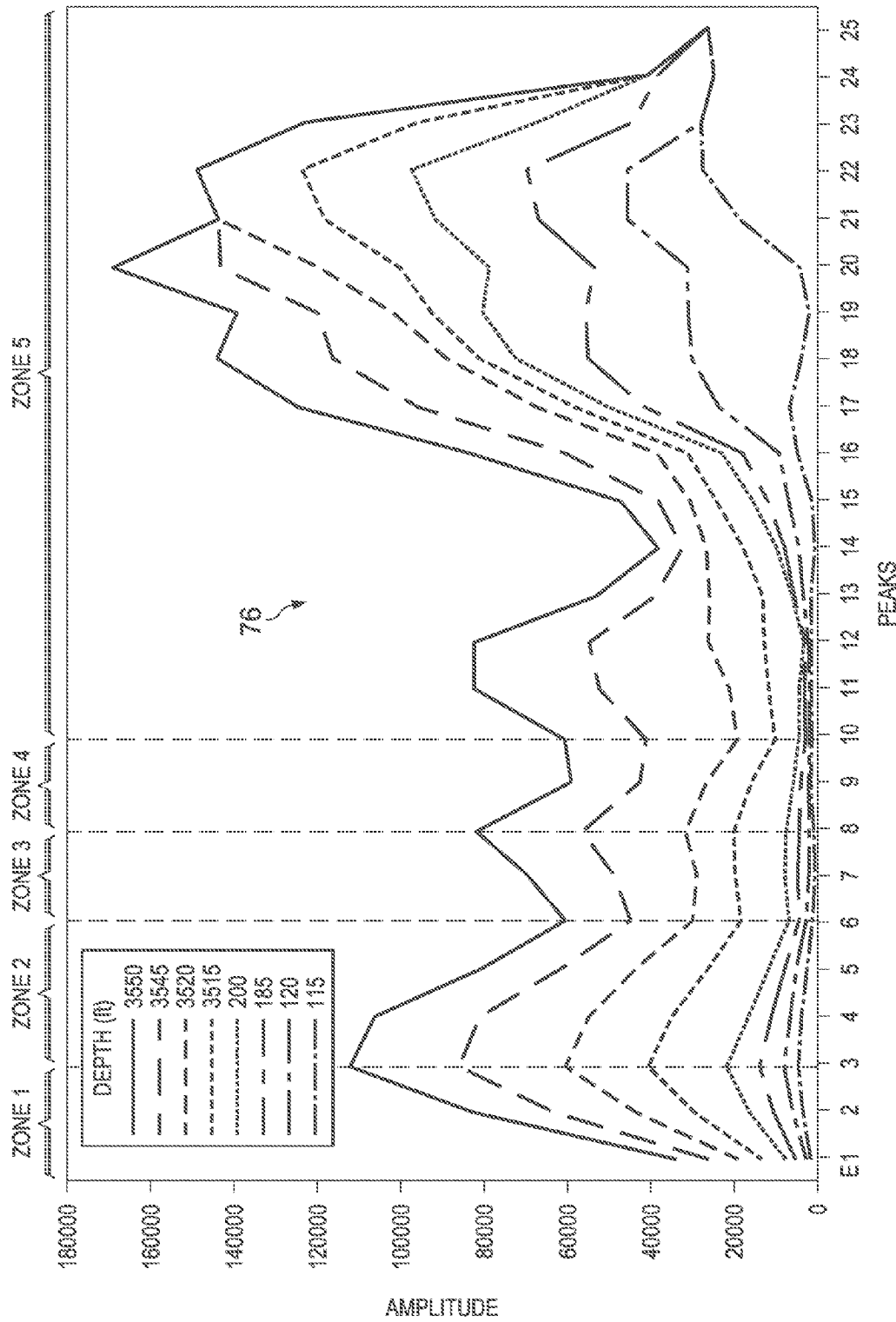

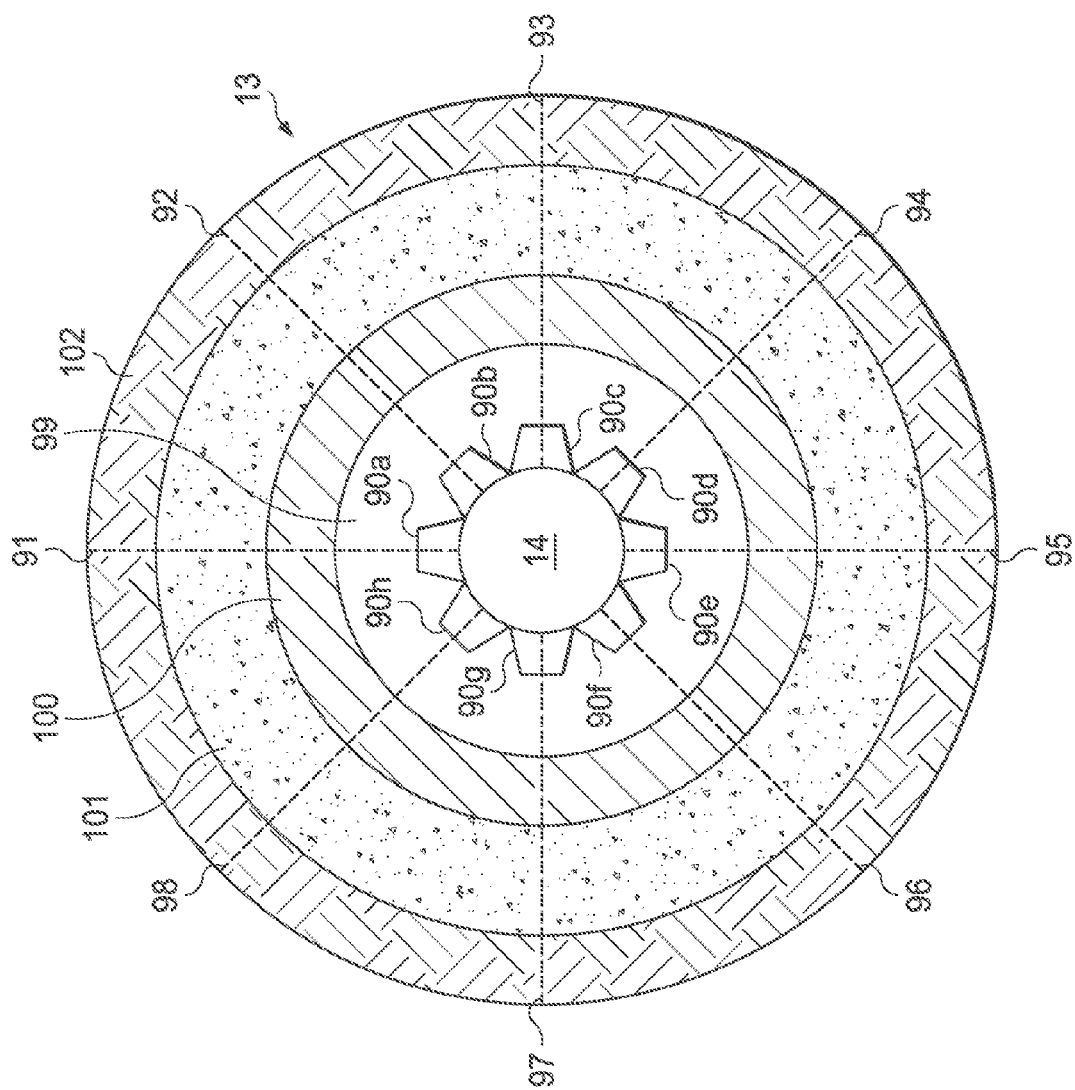
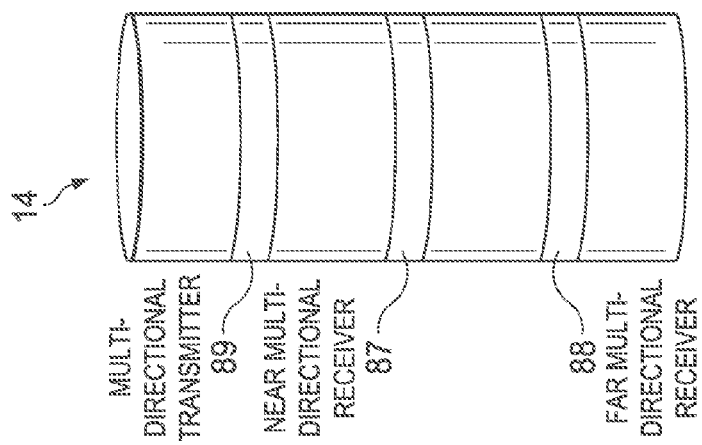
FIG. 11B
FIG. 11A

USING AMPLITUDE RATIO CURVES TO EVALUATE CEMENT SHEATH BONDING IN MULTI-STRING DOWNHOLE ENVIRONMENTS

BACKGROUND

A cased wellbore typically possesses an annular space between the casing and the formation wall that is permanently sealed by being filled with cement. This layer of cement is typically referred to as a "cement sheath." A properly formed cement sheath should fill all or nearly all of the annular space and should bond tightly to the casing and the formation.

Both sonic and ultrasonic waveforms have been used to evaluate the quality of this cement bond from a logging tool inside the casing. The logging tool, which may have one or more sonic or ultrasonic receivers and one or more sonic or ultrasonic transmitters, is lowered into a wellbore and measurements are taken at various depths. Sonic or ultrasonic waves are transmitted from the logging tool in the wellbore, and reflected waves from the casing, cement, and formation are received, recorded, processed, and interpreted to evaluate the presence and quality of the cement sheath and bond in the annular space between the casing and the formation wall.

Processing received waveforms to produce cement bond logs, however, is a highly subjective skill that is prone to substantial error and variation among different interpreters. In addition, the cement bond logs that are produced only provide bonding information pertaining to limited portions of the cement sheath—that is, they provide an incomplete and often misleading picture of the true cement bonding status of the sheath as a whole. Further, it is challenging to produce accurate cement bond logs in wellbores with multiple concentric casing strings where the cement sheath being evaluated is disposed outside of the outer casing string, since the concentric casing strings may interfere with the sonic or ultrasonic waves transmitted to the cement sheath and reflected back from the cement sheath. Thus, methods and systems for generating accurate and consistently reproducible cement bond logs that visualize most or all of the cement sheath, including in multi-string environments, are desired.

BRIEF DESCRIPTION OF THE DRAWINGS

Accordingly, there are disclosed in the drawings and in the following description various methods and systems for using amplitude ratio curves to evaluate cement sheath bonding in multi-string downhole environments. In the drawings:

FIG. 4A is a graph of four recorded waveforms at four different depths taken in a shallower section of a wellbore characterized by free ("unbonded") pipe, in accordance with embodiments.

FIG. 4B is a graph of four recorded waveforms at four different depths taken in a deeper section of a wellbore characterized by bonded pipe, in accordance with embodiments.

FIG. 5 is a graph showing the mathematical derivative plots of each waveform of FIG. 4A for determining minima and maxima, according to embodiments.

FIG. 6A is a plot of the magnitudes of the peaks and troughs of the four recorded waveforms of FIG. 4A, in accordance with embodiments.

FIG. 6B is a plot of the magnitudes of the peaks and troughs of the four recorded waveforms of FIG. 4B, in accordance with embodiments.

FIG. 7A is a plot of the absolute values of the magnitudes of the peaks and troughs of the four recorded waveforms of FIG. 4A, in accordance with embodiments.

FIG. 7B is a plot of the absolute values of the magnitudes of the peaks and troughs of the four recorded waveforms of FIG. 4B, in accordance with embodiments.

FIG. 8A is a plot of superpositioned points of the absolute value points of FIG. 7A, in accordance with embodiments.

FIG. 8B is a plot of superpositioned points of the absolute value points of FIG. 7B, in accordance with embodiments.

FIG. 9 is a combined plot of all eight series of superpositioned absolute value magnitudes of FIGS. 8A and 8B, showing the data divided according to naturally occurring zones, in accordance with embodiments.

FIG. 11A is a perspective view of a cement bond logging tool, in accordance with embodiments.

FIG. 11B is a cross-sectional view of a multi-directional cement bond logging tool disposed within a wellbore, in accordance with embodiments.

Figure 1:
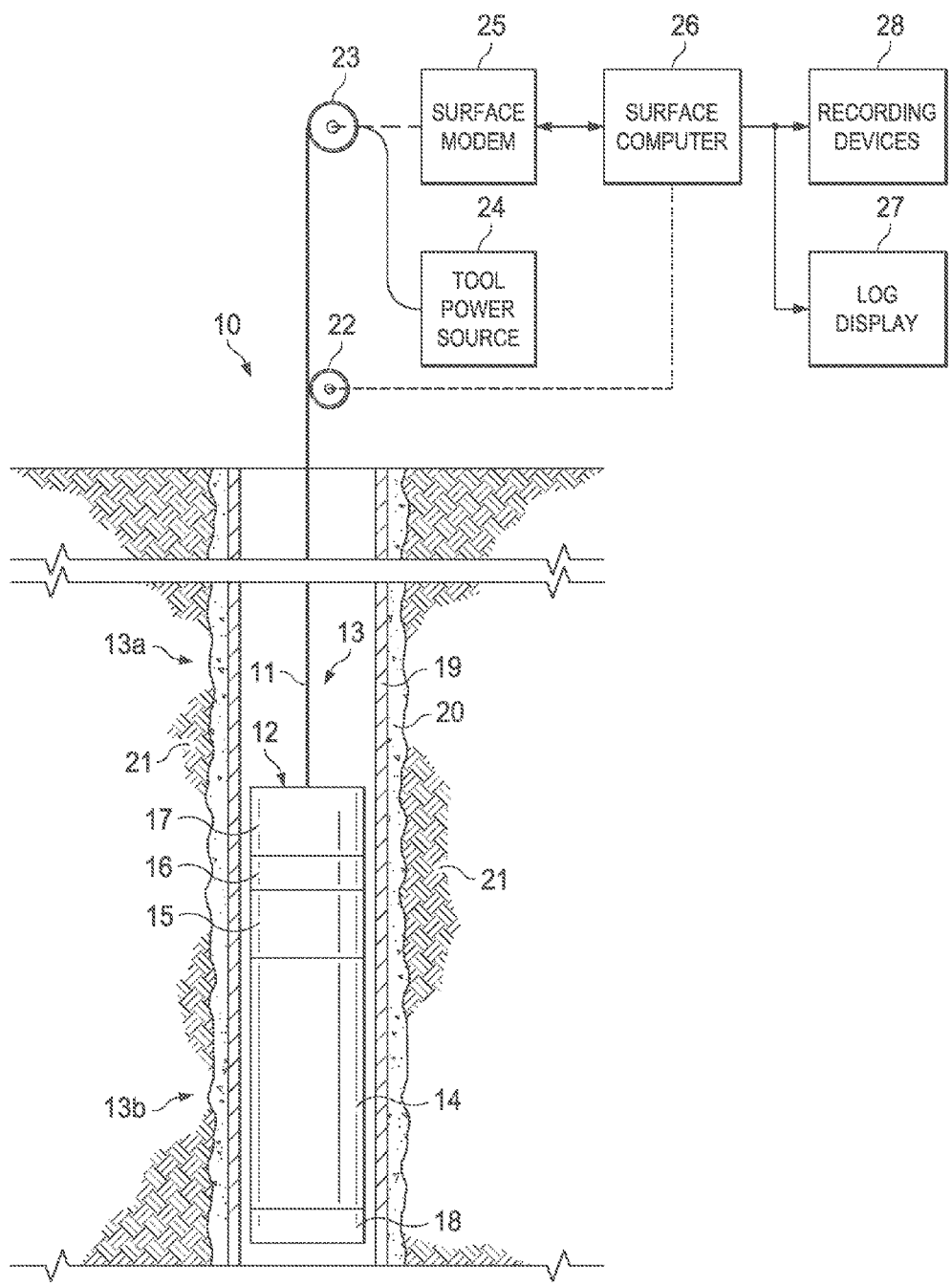
FIG. 1 is a schematic view of a well logging system in accordance with embodiments.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are techniques for generating accurate, consistently reproducible cement bond logs that visualize most or all of the cement sheath in the annular space of a wellbore in multi-string environments. The techniques include the use of a multi-directional cement bond logging tool that transmits sonic or ultrasonic waves in a radial fashion away from the tool. The waves encounter various objects as they propagate through the areas surrounding the tool, such as open space containing fluid, the casing(s), the cement sheath (or other material) in the annular space between a casing and the formation, and the formation itself. Each of these areas reflects some portion of the waves back to the multi-directional logging tool, which captures the reflected signals from multiple directions and records them as time-domain waveforms.

Each received waveform is processed (as described herein), resulting in wave amplitude values that indicate—among other things—whether the annular space between a casing and the formation contains a proper cement bond. This is possible because waveforms have different signatures when the annular space is filled with fluid (free pipe) or solid (cement). The free pipe signature includes higher amplitudes, a low rate of attenuation and a consistent waveform. When the annular space is filled with a solid material the amplitude of the waveform is reduced, the attenuation of the same waveform is increased, and the waveforms are not consistent.

The techniques entail assigning each of the processed amplitude values a different color, grayscale shade or intensity. The colors, shades or intensities for all amplitude values of waveforms received from all directions are used to form a composite image that indicates the degree of cement bonding in various areas of the annular space. The composite image is further developed by repeating the process at multiple depths of the wellbore. In this way, a color-, grayscale- or intensity-coded composite image may be formed that gives a 360-degree representation of the degree of cement bonding throughout the depth of the entire wellbore, thereby facilitating the identification of poor cement bonds in areas that may have otherwise gone undetected.

The following description is divided into multiple parts. The first part, entitled "Unidirectional Waveform Processing," primarily describes the manner in which signals received by the tool from a single direction at various wellbore depths are processed. The result of this unidirectional waveform processing is a color-, grayscale- or intensity-coded image that indicates the degree of cement bonding present in a limited portion of the annular space. The second part, entitled "Multidirectional Waveform Processing," expands the concepts described in the first part by describing how signals received from multiple directions at multiple wellbore depths are jointly processed. The result of multidirectional waveform processing is a color-, grayscale- or intensity-coded image that indicates the degree of cement bonding throughout the annular space at some or all depths of the wellbore—essentially, a visualization of the cement bond for nearly the entire wellbore. Finally, the third part—entitled "Using Ratios and Differences in Multi-String Environments"—presents a technique that may be used alone or in conjunction with other techniques described herein to evaluate cement bonding in environments having multiple concentric casing strings.

Unidirectional Waveform Processing

FIG. 1 is a schematic block diagram of a well logging system 10. A logging cable 11 suspends a sonde 12 in a wellbore 13. Wellbore 13 is drilled by a drill bit on a drill string and is subsequently lined with casing 19 and an annular space 20 that contains, e.g., cement (known in the art as a "cement bond"). Wellbore 13 can be any depth, and the length of logging cable 11 is sufficient for the depth of wellbore 13. For illustrative purposes and as described in greater detail below, a shallow portion 13a of wellbore 13 lacks a proper cement bond in the annular space 20, while a deeper portion 13b of wellbore 13 has a good cement bond in the annular space 20.

Sonde 12 generally comprises a protective shell or housing that is fluid tight and pressure resistant and that enables equipment inside the sonde to be supported and protected during deployment. Sonde 12 encloses one or more logging tools that generate data useful in analyzing wellbore 13 or in determining various material properties of the formation 21 in which wellbore 13 is disposed.

In some embodiments, a cement bond logging tool 14 (e.g., a multi-directional logging tool, such as a radial antenna, a pitch-and-catch transducer, or a pulse echo transducer) is provided, as described below with respect to FIG. 2, for determining how well the cement sheath within the annular space 20 bonds with the casing 19 and the wall of formation 21. Other types of tools may also be included in sonde 12, such as a gamma ray tool 18. Sonde 12 may also enclose a power supply 15. Output data streams from cement bonding logging tool 14 and gamma ray tool 18 may be provided to a multiplexer 16 housed within sonde 12. Sonde 12 may include a communication module 17 having an uplink communication device, a downlink communication device, a data transmitter, and a data receiver.

Logging system 10 includes a sheave 22 that is used to guide the logging cable 11 into wellbore 13. Cable 11 is spooled on a cable reel 23 or drum for storage. Cable 11 couples with sonde 12 and is spooled out or taken in to raise and lower sonde 12 in wellbore 13. Conductors in cable 11 connect with surface-located equipment, which may include a DC power source 24 to provide power to tool power supply 15, a surface communication module 25 having an uplink communication device, a downlink communication device, a data transmitter and also a data receiver, a surface computer 26 (or, more generally, any suitable type of processing logic), a logging display 27 and one or more recording devices 28. Sheave 22 may be coupled by a suitable means to an input to surface computer 26 to provide sonde depth measuring information. The surface computer 26 comprises processing logic (e.g., one or more processors) and has access to software (e.g., stored on any suitable computer-readable medium housed within or coupled to the computer 26) and/or input interfaces that enable the computer 26 to perform, assisted or unassisted, one or more of the methods and techniques described herein. The computer 26 may provide an output for a logging display 27 and a recording device 28. The surface logging system 10 may collect data as a function of depth. Recording device 28 is incorporated to make a record of the collected data as a function of depth in wellbore 13.

In some embodiments, processing logic (e.g., one or more processors) and storage (e.g., any suitable computer-readable medium) may be disposed downhole within the sonde 12 and may be used either in lieu of the surface computer 26 or in addition to the computer 26. In such embodiments, storage housed within the sonde 12 stores data (such as that obtained from the logging operations described herein), which may be downloaded and processed using the surface computer 26 or other suitable processing logic once the sonde 12 has been raised to the surface (e.g., in "slickline" applications). In some embodiments, processing logic housed within the sonde 12 may process at least some of the data stored on the storage within the sonde 12 before the sonde 12 is raised to the surface.

Figure 2:
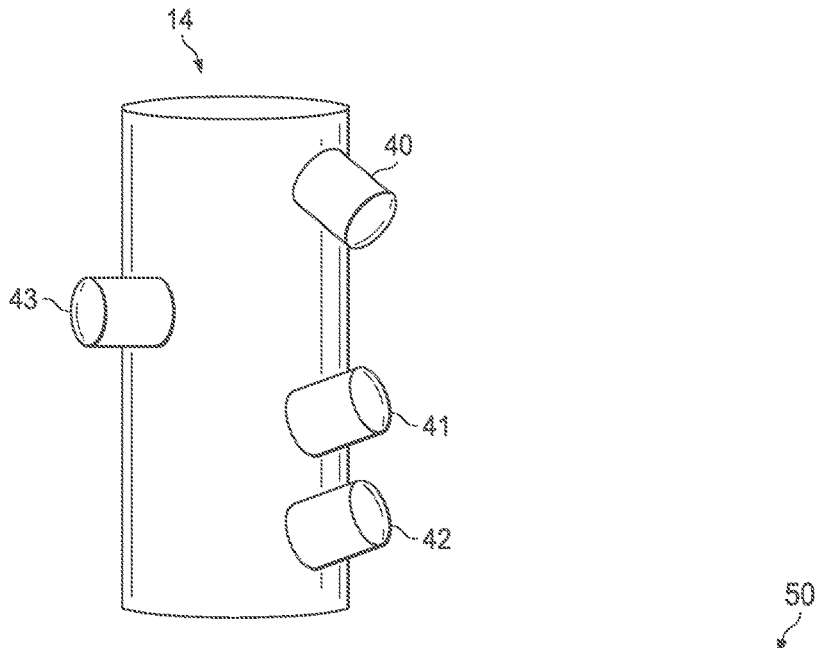
FIG. 2 is a perspective view of a cement bond logging tool according to embodiments.

FIG. 2 is a perspective view of a cement bond logging tool 14 according to one or more embodiments. Cement bond logging tool 14 may include a source transmitter 40 and two or more receivers 41, 42, which may be arranged in a pitch and catch configuration. That is, source transmitter 40 may be a pitch transducer, and receivers 41, 42 may be near and far catch transducers spaced at suitable near and far axial distances from source transmitter 40, respectively. In such a configuration, source pitch transducer 40 emits sonic or ultrasonic waves while near and far catch transducers 41, 42 receive the sonic or ultrasonic waves after reflection from the wellbore fluid, casing, cement and formation and record the received waves as time-domain waveforms. Because the distance between near catch transducer 41 and far catch transducer 42 is known, differences between the reflected waveforms received at each catch transducer 41, 42 provide information about attenuation that can be correlated to the material in the annular wellbore region, and they allow a circumferential depth of investigation around the wellbore.

The pitch-catch transducer pairing may have different frequency, spacing, and/or angular orientations based on environmental effects and/or tool design. For example, if transducers 40-42 operate in the sonic range, spacing ranging from three to fifteen feet may be appropriate, with three and five foot spacing being common. If transducers 40-42 operate in the ultrasonic range, the spacing may be less.

Cement bond logging tool 14 may include, in addition or as an alternative to transducers 40-42, a pulsed echo ultrasonic transducer 43. Pulsed echo ultrasonic transducer 43 may, for instance, operate at a frequency from 80 kHz up to 800 kHz. The optimal transducer frequency is a function of the casing size, weight, mud environment and other conditions. Pulsed echo ultrasonic transducer 43 transmits waves, receives the same waves after they reflect off of the casing, annular space and formation, and records the waves as time-domain waveforms.

Figure 3:
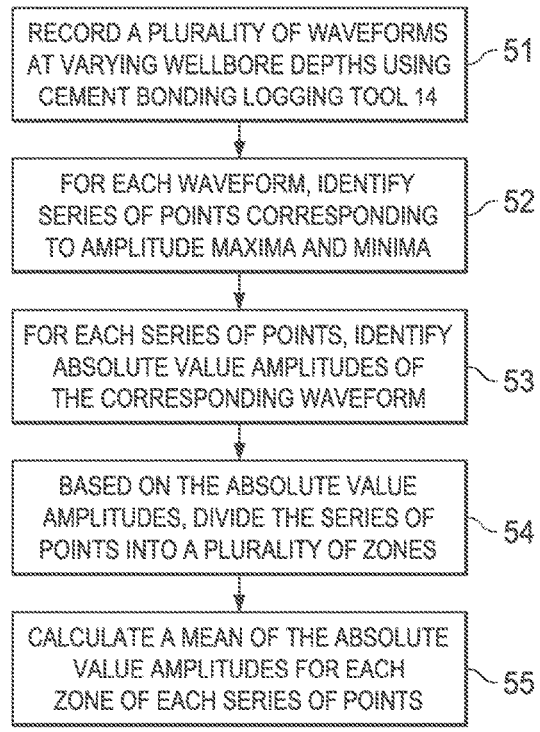
FIG. 3 is a flow chart of a method for evaluating bonding of a cement sheath in a wellbore and creating a cement bond log in accordance with embodiments.

FIG. 3 is a flow chart of a peak analysis method 50 for evaluating bonding of cement in a wellbore and creating a cement bond log according to one or more embodiments of the invention. Peak analysis method 50 may be applied to any reflected waveform received from the structures in the wellbore that are adjacent to the cement bond logging tool 14. That is, peak analysis method 50 can use—without limitation—standard sonic, pulse echo ultrasonic, and/or pitch and catch ultrasonic waveforms and process such waveforms, regardless of the waveform type or method of generation, using identified peaks and troughs to determine the type and characteristic of the material in the wellbore annular space. Peak analysis method 50 is a visual method to determine cement placement in the wellbore annular space, not only near the casing wall, but also in areas away from the casing wall, which have historically been difficult to evaluate.

For illustration of peak analysis method 50, eight illustrative, recorded, reflected waveforms are presented. Referring to FIGS. 1, 3, 4A, and 4B, at step 51, a plurality of reflected waveforms 60 at varying wellbore depths are recorded, such as by using cement bonding logging tool 14. FIG. 4A is a graph of four recorded waveforms 60a at four different depths taken in a shallower section 13a of wellbore 13 characterized by free, or unbonded, pipe, and FIG. 4B is a graph of four recorded waveforms 60b at four different depths taken in a deeper section 13b of wellbore 13 characterized by bonded pipe. It can be seen that there is a different waveform response at the free pipe zone and the bonded pipe zone. In the free pipe zone 13a, the amplitudes of waveforms 60a are relatively high. Because cement in the annular space 20 attenuates the waves in bonded section 13b, waveforms 60b are characterized by a lower amplitude. The increased amplitude of waveforms 60b to the right of the chart are attributable to the response of formation 21.

At step 52, for each of the recorded waveforms 60, location of amplitude maxima and minima, or peaks and troughs, are identified. In some cases, maxima and minima can be readily identified by visually inspecting the waveforms 60, but such identification is difficult and inaccurate with complex waveforms. Accordingly, in embodiments, maxima and minima are identified by taking the mathematical derivative of each waveform 60. FIG. 5 is a graph showing the mathematical derivative plots 63 of each waveform 60a of FIG. 4A. Each instance where derivative slope plot 63 changes sign (going from positive to negative or negative to positive) corresponds to a peak or trough of the corresponding waveform 60a. Two such points 64, 65 are labeled on FIG. 5 for illustration, which correspond to peaks 61 and troughs 62 of waveforms 60a. Although not illustrated directly, the same procedure is performed with each waveform 60b of FIG. 4B.

At step 53, for each maxima and minima identified in step 52, the absolute values of the amplitudes of waveforms 60 are identified. Step 53 is illustrated in two stages. FIGS. 6A and 6B are plots of the magnitudes 66 of the peaks and troughs of waveforms 60a, 60b of FIGS. 4A, 4B, respectively. The time value corresponding to each identified maxima and minima (e.g., points 64, 65 of FIG. 5) are used to extract the magnitude values of waveforms 60 at the same times. However, magnitudes are plotted as a numbered series of points (E1, E2 . . . $E_n$) rather than based on the timescale where E1 corresponds to the amplitude of the first arrival. For instance, magnitude values 67, 68 correspond to peaks 61 and troughs 62 of waveforms 60a. As shown, the magnitude points 66 may be connected by straight lines to aid viewing. The second stage of step 53 is illustrated by FIGS. 7A and 7B, which are plots of the absolute values 69 of the magnitude values 66. For example, absolute value points 72 and 74 correspond to magnitude values 67, 68 of FIG. 6A. Again, the absolute value points 69 may be connected by straight lines to aid viewing. By using absolute values, both the positive and negative peaks of the entire waveform 66 are considered together in a simplified manner.

From FIGS. 7A and 7B, it is possible to identify some general trends in the data of each waveform, and various natural groupings or sections appear. Stacking, or superpositioning, the absolute value points 69 further highlights these groupings. FIGS. 8A and 8B illustrate this step. FIGS. 8A and 8B are plots of superpositioned points 76 of the absolute value points 69 of FIGS. 7A and 7B. For example, a first series 77 of absolute value magnitudes 76a of FIG. 8A is the same as series 70 of FIG. 7A. A second series 78 of absolute value magnitudes 76a of FIG. 8A is the summation of corresponding absolute value magnitudes 69a of series 70 and 71 of FIG. 7A. A third series 79 of absolute value magnitudes 76a of FIG. 8A is the summation of corresponding absolute value magnitudes 69a of series 70, 71 and 73 of FIG. 7A. Likewise, the fourth series 80 of absolute value magnitudes 76a of FIG. 8A is the summation of corresponding absolute value magnitudes 69a of series 70, 71, 73, and

75 of FIG. 7A. FIG. 8B is generated from FIG. 7B in the same manner. The order in which the absolute value magnitudes are stacked is not critical, as it merely serves to highlight natural trends in the data.

Using the above sequence of steps 51-53, various patterns begin to emerge from both the free and bonded sections 13$a$, 13$b$ of wellbore 13. A person of ordinary skill in the art will recognize that there are four or more distinct areas, breaks, or zones in the waveform response. Accordingly, at step 54 (and as described below with respect to FIG. 9), the series of points (E1, E2 . . . E$_n$) is analyzed and sorted based according to these naturally occurring divisions. Each zone can be adjusted or shifted based on the waveform response, casing size, casing weight, cement properties and other environmental conditions of the well. In the example of the present disclosure five zones are evident, but a greater or lesser number of zones may be appropriate for a given set of waveforms.

FIG. 9 is a combined plot of all eight series of stacked absolute value magnitudes 76 of FIGS. 8A and 8B. The vertical lines show where an analyst may examine the waveform response data and divide the series of points into four or more zones according to step 54. Zone 1 corresponds to casing signal arrivals and Zone 5 corresponds to formation signal arrivals. Zones 2-4 therefore encompass the annular area between the casing and the formation, with Zones 2 and 4 being somewhat influenced by the casing and formation, respectively.

In some embodiments, the grouping of zones is based on the shape of the stacked waveforms as shown in FIG. 9. In such embodiments, zones are grouped according to slope changes of the stacked waveforms. For example, as shown in FIG. 9, dramatic slope changes may be observed at E3, E6, E8, and E10, which are the points that divide Zones 1-5. The threshold that a particular slope change must exceed to qualify as a zone dividing point may be set as suitable and desired. In other embodiments, the peak values themselves may be used to divide the waveforms into zones—for instance, the low and high peaks may be designated as the points at which the zones are divided. Referring to FIG. 9, for instance, point E3 is the highest peak that occurs prior to the next low peak (i.e., E6), so E3 may be designated as the dividing line between Zones 1-2. Peak E4 is of a value similar to that of E3, so E4 may be designated as the dividing line between Zones 1-2 in lieu of E3. Similarly, peak E6 is the lowest value occurring prior to the next high point (i.e., E8), so E6 may be designated as the dividing line between Zones 2-3.

In preferred embodiments, each zone has a minimum of two peaks, although this is not required. In some embodiments, waveforms with the highest amplitudes—which generally correspond to free pipe areas—may have zones that are designated separately from those waveforms with the lowest amplitudes, which generally correspond to cement bonded areas. Thus, for instance, referring to FIG. 9, in these embodiments the determination of zones for the top four waveforms—which have the highest amplitudes—may be performed separately from the determination of zones for the bottom four waveforms, which have the lowest amplitudes. In some embodiments, zones may be selected such that each zone corresponds to a separate "wave" in the waveforms. For instance, in such embodiments, Zones 1-2 would be separated at E6; Zones 2-3 would be separated at E9, and so forth. Any of these techniques may be used, or alternative, suitable techniques may be used instead. Regardless of the techniques used, in preferred embodiments, the zones that are to be plotted (as described below) are selected such that they do not include formation signals, which are typically signals of very high amplitude relative to other signal arrivals from the casing string and annular space (e.g., in FIG. 9, the formation signal arrivals likely correspond to peaks E16 and onward).

Once the zones are selected at step 54, the average amplitude for each waveform within each zone is determined at step 55. This is accomplished by calculating, for each zone, the mean value of each waveform's peaks. Thus, for instance, referring to FIG. 9, each of the waveforms present in Zone 1 may be averaged using the peaks E1, E2 and E3 present in Zone 1. This results in multiple mean values for Zone 1, each mean value corresponding to a different waveform. Similarly, peaks E4, E5 and E6 are used to calculate the mean value for Zone 2. In some embodiments, the peaks that straddle two zones (e.g., peaks E3, E6) may be used to calculate the mean values of both zones that are straddled. Alternatively, in some embodiments, such a peak—like peak E3—is used to calculate the mean value for Zone 2 and not for Zone 1. In some embodiments, the average amplitude of Zone 1 peaks are calculated twice, once with the 1st peak (E1) and once without. Because E1 values are inherently smaller than E3 values, removing the first set of values from the calculation of the arithmetic mean facilitates comparison of Zone 1 to the other zones.

In existing methods, pipe amplitude is calculated from the amplitude of the E1 arrival and then normalized to a certain value based on casing size and weight. With peak analysis method 50, however, the E1 arrival data is not used in at least some embodiments. Accordingly, the waveform data is not normalized to a certain value for pipe size and weight but rather is optionally normalized to the free pipe value for the casing in question. Thus, the highest amplitude of Zone 1 is determined to be 100% free (assuming that there is a free pipe section), and all the other amplitudes for the other zones are normalized accordingly. Stated another way, the end result of the above-described steps is a number of different amplitude curves determined by the natural break in the waveform response and normalized to a free pipe value of unity. Although not required, such normalization allows comparison of the waveform responses to a known point of reference.

The average amplitudes for each zone, whether normalized or not, indicate a quality of cement bonding. However, to facilitate interpretation of such amplitude data, a plot with color, grayscale, or intensity mapping may be used to visually show the amplitude values of each zone at each depth in the wellbore. For instance, colors may be used ranging from a black for low amplitudes grading to lighter colors then finally to a light blue which grades to a dark blue at 100 percent free pipe amplitude. A grayscale scheme with various shades may be used in lieu of such colors, as may a scheme employing an intensity map.

Figure 10A:
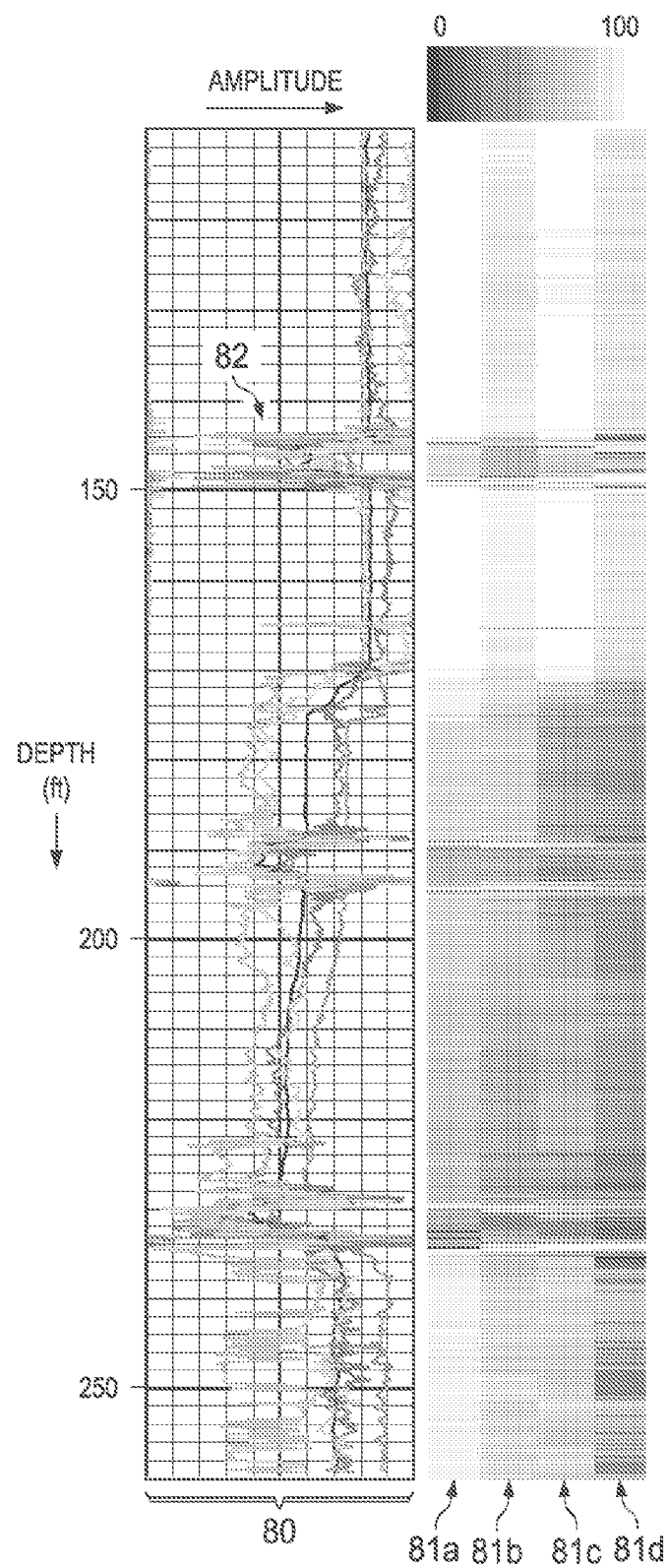
FIG. 10A is a plot of the absolute value magnitudes of FIG. 8A averaged according to the zones of FIG. 9, shown both as amplitude curves versus depth and as grayscale logs versus depth, in accordance with embodiments.
Figure 10B:
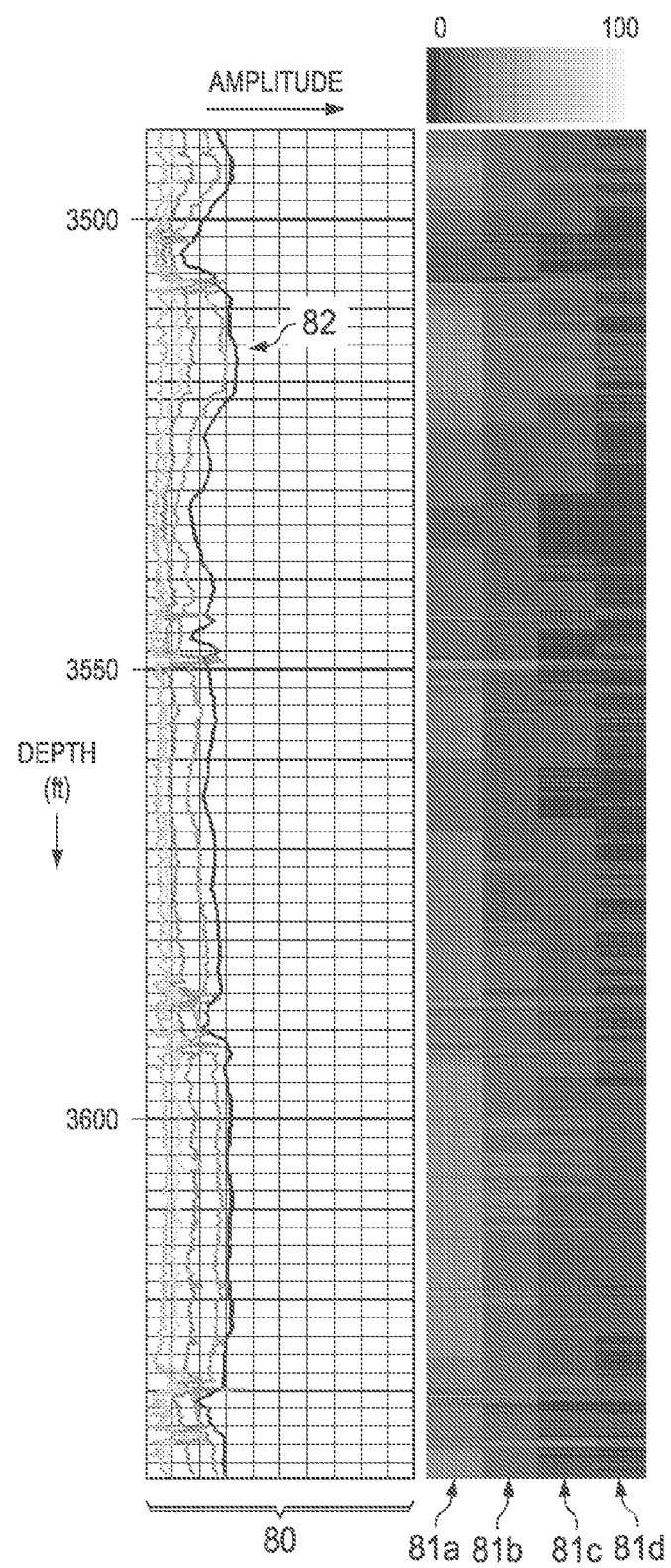
FIG. 10B is a plot of the absolute value magnitudes of FIG. 8B averaged according to the zones of FIG. 9, shown both as amplitude curves versus depth and as grayscale logs versus depth, in accordance with embodiments.

FIGS. 10A and 10B illustrate such a plot (or "cement bond log"). FIGS. 10A and 10B are logs of the absolute value amplitudes of FIGS. 8A and 8B, respectively, averaged according to the zones of FIG. 9. FIGS. 10A and 10B show the zonal averaged absolute value amplitude data, both as amplitude curves versus depth and as color-, grayscale- or intensity-maps versus depth. A left-hand graph 80 includes four amplitude curves 82 (labeled AV1PEAKW, AV2PEAK, AV3PEAK, AV4PEAK) of the zonal averaged absolute value amplitude data versus depth. To the immediate right of graph 80, curves 82 are re-plotted as grayscale logs 81$a$-81$d$, which show the grayscale coding of the above curves in the same order, with a scale from 0 to 100 and with depth shown on the vertical axis. Log 81$a$ corresponds to Zone 1; log 81$b$ corresponds to Zone 2; log 81c corresponds to Zone 3; and log 81d corresponds to Zone 4. Thus, log 81a represents amplitudes of waves received from the casing, log 81d represents amplitudes of waves received from the formation, and logs 81b and 81c represent amplitudes of waves received from the annular space between the casing and the formation. The darker shades indicate good cement bond (as shown in FIG. 10B, which corresponds to the lower part 13b of the wellbore), and the lightest shades indicate poor cement bond (as shown in FIG. 10A, which corresponds to the upper part 13a of the wellbore). Other schemes, including color and intensity mapping, may be used as appropriate.

The foregoing technique is useful for mapping the entire depth of a well along a single vertical column. That is, the technique is able to create a visual depiction of the waveform amplitudes received from the fluid, casing, annular space, and formation for the entire depth of the well—but only for unidirectional waveforms. Thus, although the mapping may accurately indicate the quality of cement bonding in the direction in which the tool antenna is oriented, it does not provide information about the cement bonding in directions where the tool antenna is not oriented.

Multidirectional Waveform Processing

Accordingly, in some embodiments, a multi-directional cement bond logging tool may be used to transmit sonic and/or ultrasonic waves to and receive sonic and/or ultrasonic waves from multiple directions at each depth, thereby providing composite images that visualize a substantial portion of the annular space at each depth. FIG. 11A provides a perspective view of a multi-directional cement bond logging tool 14. The tool 14 comprises a multi-directional transmitter 89 and multiple directional receivers 87, 88. In some embodiments, a multi-directional transceiver may be used in lieu of separate transmitters and receivers. The remainder of this discussion assumes the use of transceiver embodiments, although techniques described herein may be adapted for use with any suitable logging tool configuration. FIG. 11B provides a cross-sectional view of a multi-directional cement bond logging tool (e.g., radial antenna) 14 disposed within a wellbore 13. The tool 14 is disposed within a portion 99 of the wellbore that contains fluid or another known material. Concentrically adjacent to the portion 99 is the casing string 100. Concentrically adjacent to the casing string 100 is the annular space 101—an area of particular interest because it contains a cement layer, the quality of which the tool 14 is intended to ascertain. Concentrically adjacent to the casing string 100 is the formation 102.

The logging tool 14 comprises multiple transceivers (or "segments") 90a-90h disposed in a radial fashion about the circumference of the tool 14, although the scope of this disclosure is not limited to any specific number of segments or any particular radial positioning of the segments. Using more segments will provide additional data from additional parts of the annular space and cement layer, thereby producing an image of the annular space and the cement bond layer that has greater resolution. In contrast, using fewer segments provides fewer data points and thus produces an image of the annular space and cement layer that has poorer resolution. Each of the segments 90a-90h is capable of transmitting sonic and/or ultrasonic waves in the general direction indicated by dashed lines 91-98, respectively. Similarly, each of the segments 90a-90h is adapted to receive sonic and/or ultrasonic waves from the general direction indicated by dashed lines 91-98, respectively. Again, as explained, any suitable tool configuration may be used.

In practice, each of the segments 90a-90h transmits signals in the directions of lines 91-98, respectively, and subsequently receives reflected waves and records waveforms accordingly. The waveforms recorded by segment 90a are processed as described in detail above with respect to FIGS. 3-10B, thereby producing a visual depiction of the waveform amplitudes for multiple zones in the general direction of dashed line 91. Stated another way, processing the waveforms recorded by segment 90a produces an image (e.g., coded using color, grayscale, intensity) that indicates the quality of cement bond in the portion of the annular space that coincides with dashed line 91. Tool 14, however, also comprises segments 90b-90h, each of which records its own waveforms, just like segment 90a. These waveforms, when processed as described above, produce images that indicate the quality of cement bond in the portions of the annular space that coincide with the dashed lines 92-98. The net result of this process using segments 90a-90h is a set of eight images indicating the quality of cement bond at the portions of the annular space coinciding with the eight dashed lines 91-98. Stated another way, the zone(s) that corresponds to the annular space (e.g., Zone 3) is visualized at the points indicated by dashed lines 91-98. The data in these multiple images of the annular space zone(s) may be aggregated to produce a composite set of data (generally referred to herein as a "shell" because the data is obtained from numerous points around the circumference of the zone(s)) that indicates the quality of cement bond throughout the annular space 101 for the depth at which the waveforms were recorded. The shell data may be modified using any suitable interpolation technique (e.g., a linear averaging technique) to determine appropriate averaged absolute value amplitude data for the portions of the zone(s) that are located in between the dashed lines 91-98. By repeating this process at multiple depths throughout the wellbore, a composite shell image is formed to produce an indication of the quality of cement bond for the entire annular space at all depths of the wellbore—essentially, a visual depiction of the cement bond quality for the entire annular space 101.

Figure 12:
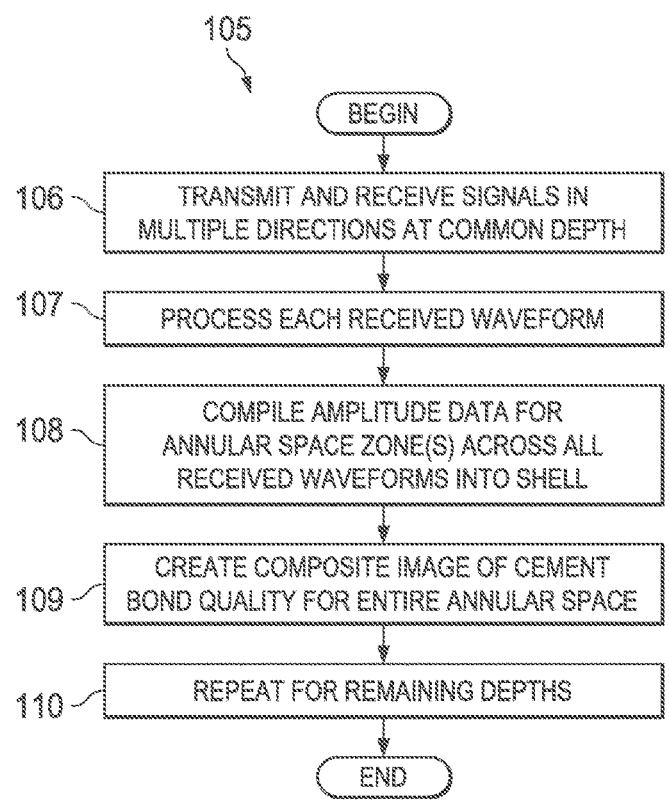
FIG. 12 is a flowchart of a method usable to produce grayscale logs for different zones, in accordance with embodiments.
Figure 13:
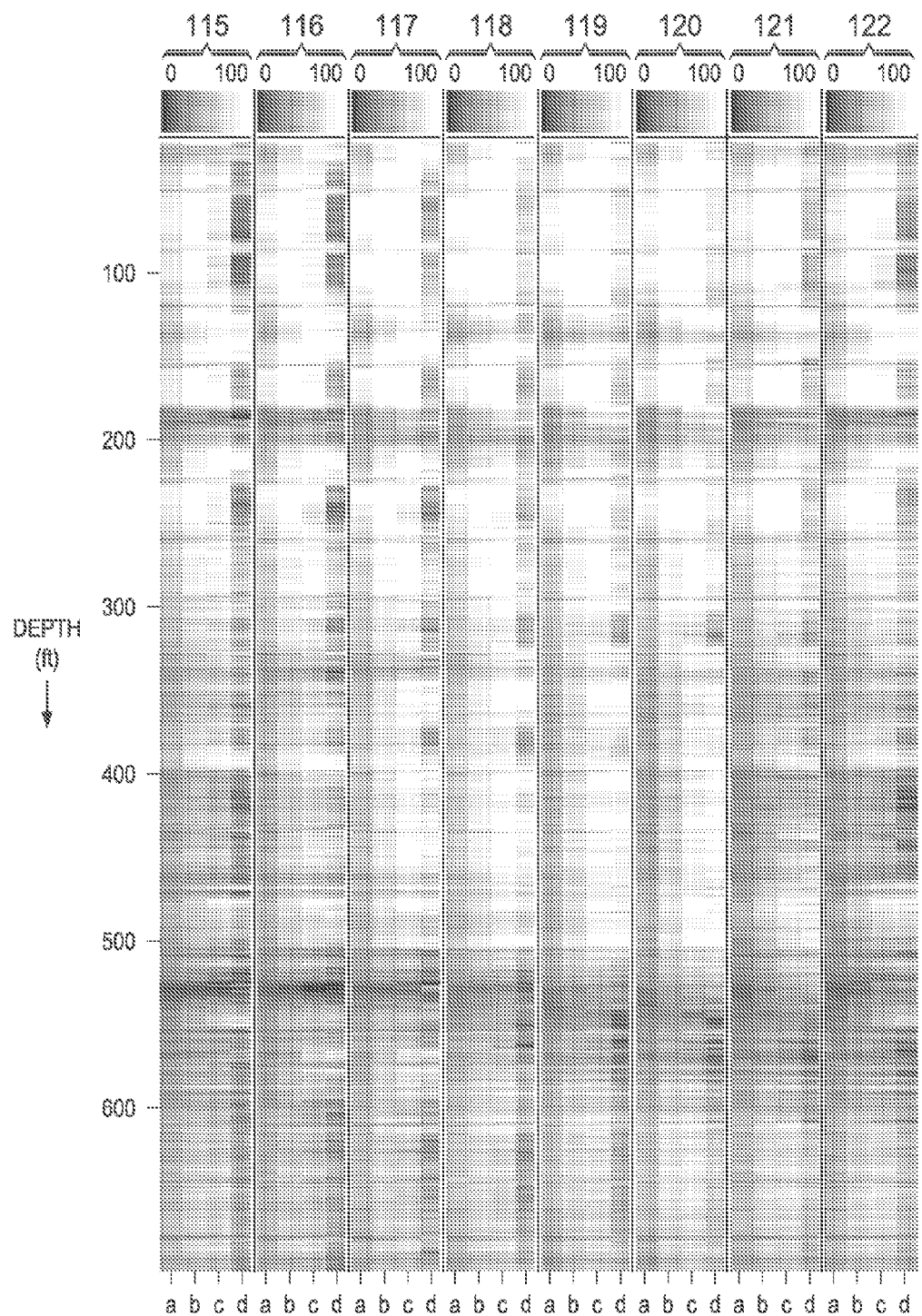
FIG. 13 is a plot of the waveforms recorded by each segment of a multi-directional antenna after having been processed as described with respect to FIGS. 1-10B, shown as grayscale logs versus depth, in accordance with embodiments.

FIG. 12 shows a flowchart of a method 105 usable to produce logs for different shells. The method 105 first comprises transmitting sonic and/or ultrasonic signals in and receiving sonic and/or ultrasonic signals from multiple directions (step 106). As explained with respect to FIG. 11, this step may be performed by a multi-directional cement bond logging tool 14, such as a multi-directional antenna. After the tool 14 records time-domain waveforms based on incoming sonic and/or ultrasonic signals, the method 105 comprises processing each received waveform using the techniques described above with respect to FIGS. 3-10B (step 107). Performing step 107 results in averaged absolute value amplitude data in each zone for each received waveform. FIG. 13 shows eight grayscale logs 115-122, although other schemes, such as color or intensity mapping, also may be used. The logs 115-122 in FIG. 13 correspond to waveforms recorded by the segments 90a-90h, respectively. In addition, each logs 115-122 contains multiple sub-logs a-d. Sub-logs a-d correspond to waveform data from Zones 1-4, respectively. Thus, for instance, log 115a indicates the averaged absolute value amplitude data in Zone 1 (e.g., the general area of the casing string 100) for the waveform received from segment 90a. Similarly, for example, log 121c indicates the averaged absolute value amplitude data in Zone 3 (e.g., the outer area of the annular space 101 within which the cement layer is disposed) for the waveform received from segment 90g. Although each iteration through method 105 processes waveforms at a single depth of the wellbore, the logs 115-122 in FIG. 13 plot depth on the y-axis to demonstrate how a complete set of logs may appear for the entire depth of the wellbore.

As explained above, each of the dashed lines 91-98 in FIG. 11B indicates the general areas from which the waveform data of FIG. 13 is obtained. Dashed line 91 corresponds to the data shown in log 115, while dashed line 92 corresponds to the data shown in log 116, and so on. For this reason, it is possible to rearrange the logs of FIG. 13 in such a way that they provide cross-sectional views of the amplitude data from the wellbore. Stated another way, and referring to FIG. 11B, the data for dashed line 91—which corresponds to log 115—can be grouped with the data for dashed line 95—which corresponds to log 119. Grouping the logs of dashed lines that are separated by 180 degrees in this way provides a cross-sectional view of the logs 115-122, thereby making the logs easier to understand and interpret.

Figure 14:
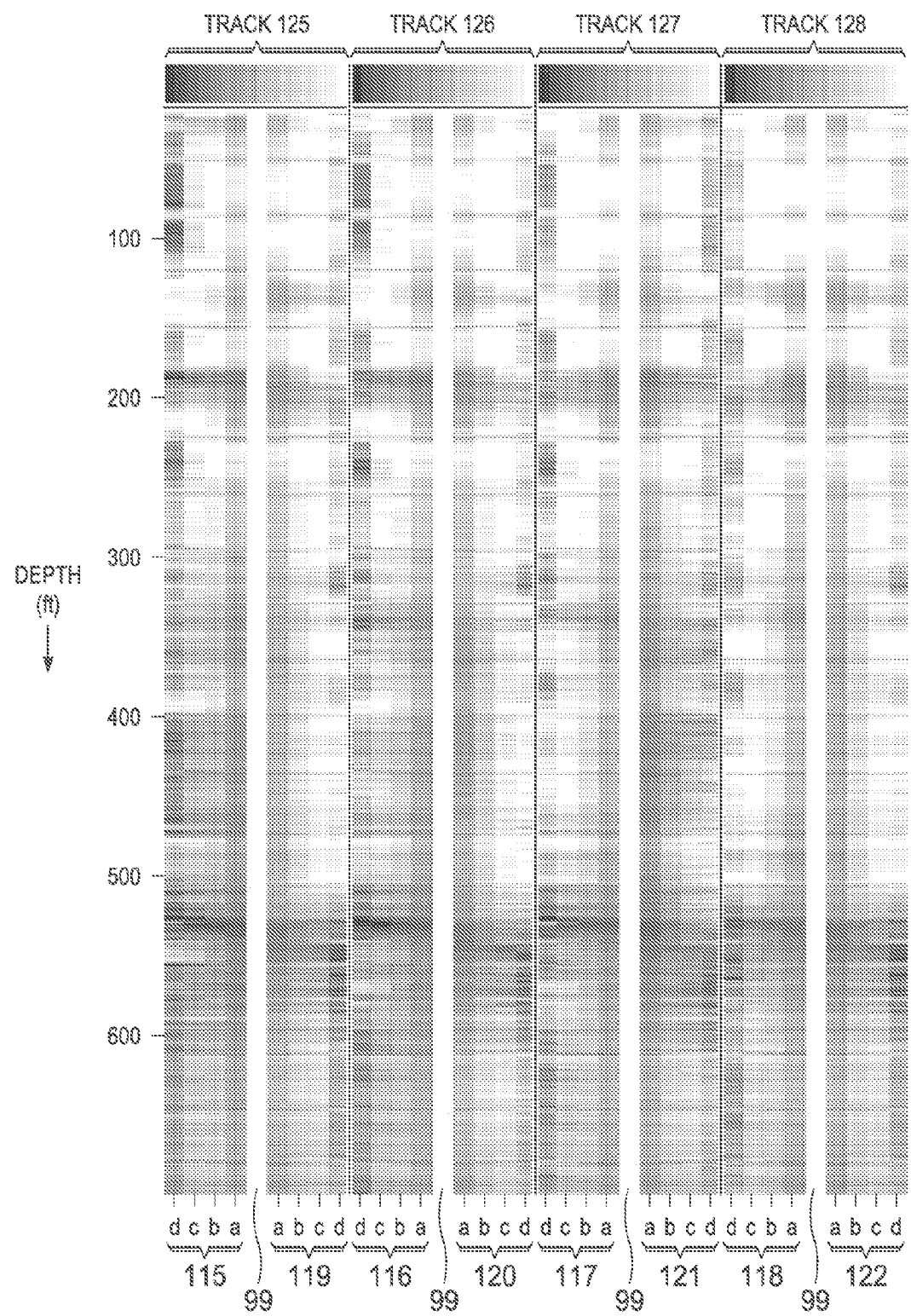
FIG. 14 shows the grayscale logs of FIG. 13 rearranged to facilitate interpretation, in accordance with embodiments.

FIG. 14 shows such a rearrangement of logs 115-122. Specifically, logs 115 and 119 are grouped together (shown as log 125) because they correspond to dashed lines 91 and 95. Similarly, logs 116 and 120 are grouped together (shown as log 126) because they correspond to dashed lines 92 and 96. Logs 117 and 121 are grouped (shown as log 127) because they correspond to dashed lines 93 and 97, and logs 118 and 122 are grouped (shown as log 128) because they correspond to dashed lines 94 and 98. As shown in FIG. 14, logs 115 and 119 are oriented in such a way that the open wellbore space 99 is in the middle, Zone 1 data (i.e., logs 115a and 119a) is immediately adjacent to the open space 99, Zone 2 data (i.e., logs 115b and 119b) is immediately adjacent to the Zone 1 data, Zone 3 data (i.e., logs 115c and 119c) is immediately adjacent to the Zone 2 data, and Zone 4 data (i.e., logs 115d and 119d) is immediately adjacent to the Zone 3 data. In this way, track 1 shows what a cross-sectional view of the averaged absolute value amplitude data taken at dashed lines 91 and 95 would look like for the entire wellbore at all depths, starting with the open space 99 and moving outward with logs 115a and 119a representing data roughly corresponding to the casing string 100, logs 116a and 120a representing data roughly corresponding to the inner portion of the annular space 101, logs 117a and 121a representing data roughly corresponding to the outer portion of the annular space 101, and logs 118a and 122a representing data roughly corresponding to the area of the annular space 101 immediately adjacent to the formation 102. Logs 126-128 are similarly arranged.

Referring again to FIG. 12, the method 105 next comprises aggregating the averaged absolute value amplitude data for each zone across all received waveforms into shells (step 108), which were briefly described above. For instance, Zone 1 data across all waveforms—i.e., data represented by logs 115a, 116a, 117a, 118a, 119a, 120a, 121a and 122a—are aggregated into a shell. These data were collected from the casing string 100 at the points coincident with dashed lines 91-98. The areas of string 100 not coincident with dashed lines 91-98, however, are unaccounted for and are not represented in the shell. Accordingly, any suitable interpolation technique (e.g., a linear averaging technique) is used to determine data values for the areas of the string 100 between the dashed lines 91-98. In this way, the shell presents a more complete picture of the data for the entire string 100. A similar process is performed for Zone 2 data across all waveforms—that is, data corresponding to the inner portion of the annular space 101; for Zone 3 data across all waveforms, which correspond to the outer portion of the annular space 101; and for Zone 4 data across all waveforms, which correspond to the area of the annular space 101 that is immediately adjacent to the formation 102. The aggregated data is then used to create a composite image of cement bond quality for each shell (step 109). Specifically, the images are generated using the data from logs 115-122 and any of a variety of suitable interpolation techniques; each image corresponds to a different shell and represents the averaged absolute value amplitude data for that shell. Steps 106-109 are then repeated at numerous depths within the wellbore 13 (step 110), and additional data obtained from each depth is added to the composite shell images generated in step 109 to visualize the entire wellbore. The number of depths at which the process 105 is performed may vary, but in the instance that the averaged absolute value amplitude data between any two depths in missing, any suitable interpolation technique may be used to determine that data, and the data may be added to the composite shell image in question.

Figure 15:
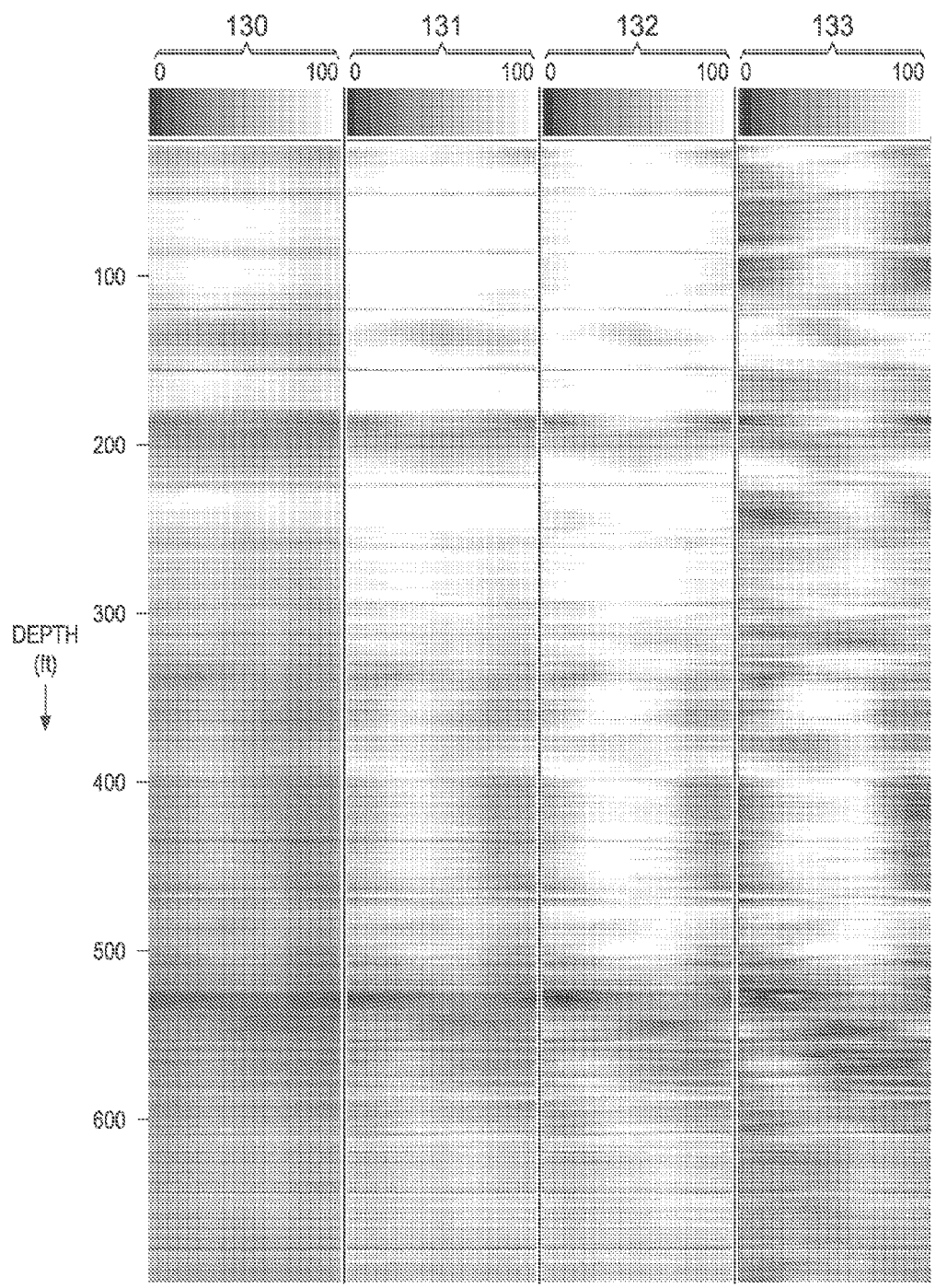
FIG. 15 shows multiple grayscale logs versus depth, each log representing the amplitude of waveforms received across a different shell, in accordance with embodiments.

FIG. 15 shows a set of such composite images (or composite logs) for each shell. Image 130 is a grayscale image of the averaged absolute value amplitude data for the shell that corresponds to Zone 1—e.g., the casing string. It is formed using all available Zone 1 data—that is, data in logs 115a, 116a, 117a, 118a, 119a, 120a, 121a and 122a— and any of a variety of suitable interpolation techniques. Similarly, image 131 is a grayscale image of the averaged absolute value amplitude data for the shell that corresponds to Zone 2—e.g., the inner area of the annular space. It is formed using all available Zone 2 data—that is, data in logs 115b, 116b, 117b, 118b, 119b, 120b, 121b and 122b—and a suitable interpolation technique. Image 132 is a grayscale image of the averaged absolute value amplitude data for the shell that corresponds to the outer portion of the annular space 101. It is formed using all available Zone 3 data—that is, data in logs 115c, 116c, 117c, 118c, 119c, 120c, 121c and 122c—and a suitable interpolation technique. Finally, image 133 is a grayscale image of the averaged absolute value amplitude data for the area of the annular space 101 immediately adjacent to the formation 102. It is formed using all available Zone 4 data—that is, data in logs 115d, 116d, 117d, 118d, 119d, 120d, 121d and 122d—and a suitable interpolation technique. Images 131-133 may be of greatest interest, because they are visual representations of the cement layer disposed within the annular space 101. Lighter shades represent high averaged absolute value amplitude data and thus poor cement bonds (or the absence of cement altogether), while darker shades represent low averaged absolute value amplitude data and thus strong cement bonds.

This discussion describes Zones 1-4 (and their corresponding shells) as if they precisely coincide with the casing 100, inner annular space 101, outer annular space 101, and the annular space 101 immediately adjacent to the formation 102, respectively. In some embodiments, however, this may not be the case. The recorded waveforms may, in some cases, be divided into zones (FIG. 4, step 54; FIG. 10) such that a single zone (and the corresponding shell) coincides with multiple features in the wellbore. For instance, instead of corresponding only to the casing string 100, Zone 2 may correspond to some or all of the casing string 100 and some or all of the annular space 101. In addition, while the embodiments have been described above in the context of four zones and four shells, any suitable number of zones and shells may be used, according to the discretion of one of ordinary skill in the art. Further, the techniques described thus far have been in the single-casing string context. The same techniques, however, also may be used to evaluate cement in annular spaces behind multiple casing strings. In such embodiments, waveforms may be divided into more than four zones so that each annular space that contains cement is assigned to at least one zone. Further still, although in the foregoing embodiments sonic and/or ultrasonic signals are transmitted and received using the multi-directional logging tool 14 shown in FIGS. 11A-11B, in some embodiments, other suitable tools are used, such as the pitch and catch transducers 40-42 or pulse echo transducer 43 of FIG. 2. These transducers, though unidirectional, may be mounted on a wireline such that they spin about its axis, thereby enabling the transducers to transmit sonic and/or ultrasonic signals in and receive sonic and/or ultrasonic signals from multiple directions.

Using Ratios and Differences in Multi-String Environments

Figure 16:
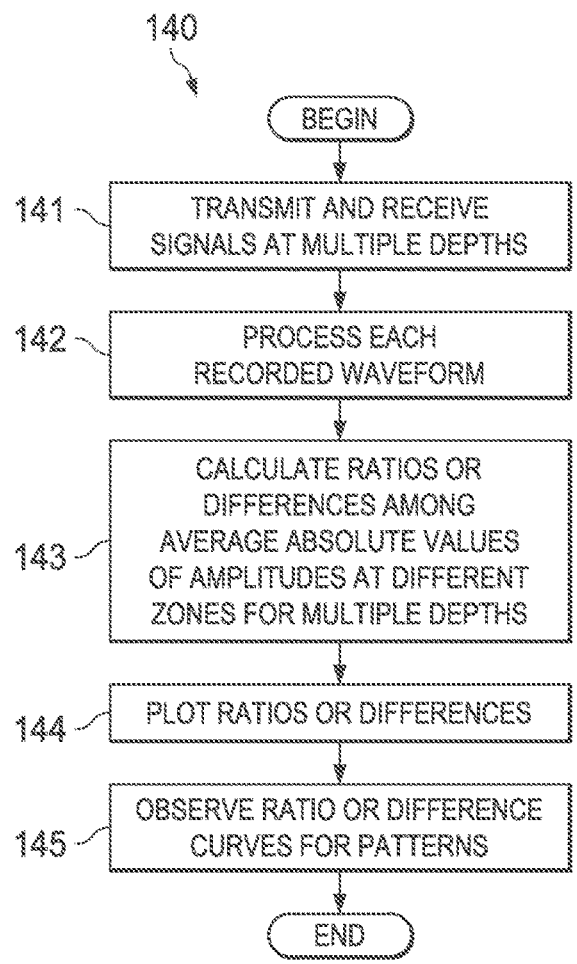
FIG. 16 is a flowchart of a method usable to produce ratio or difference plots to facilitate identification of strong cement bond locations and poor cement bond locations, in accordance with embodiments.

FIG. 16 is a flowchart of a method that may be used to evaluate the quality of cement present in annular spaces behind one or more casing strings. Although it is described in the context of a unidirectional cement bond logging tool, it may also be performed in embodiments deploying a multi-directional logging tool. In addition, although the technique is described in the context of a two-casing string environment, the technique also may be performed in downhole environments with a single casing string or more than two casing strings. The method generally entails determining the averaged absolute value amplitude data for each of a plurality of zones of a waveform as described above with respect to FIGS. 3-10B, and then determining numerical ratios or differences between the data for the zones. This process is repeated at multiple depths. The calculated ratios or differences are then plotted as a function of depth and are analyzed to identify areas of an annular space (e.g., an annular space behind the outer of two concentric casing strings) that possess strong cement bonding and those than have weaker cement bonding.

The method 140 begins with transmitting and receiving sonic and/or ultrasonic signals at multiple depths of a wellbore (step 141), and it further comprises processing each recorded waveform according to the techniques described above with respect to FIGS. 3-10B (step 142). The result of step 142 is a set of average absolute value amplitude data for each of a plurality of zones and at multiple wellbore depths. The method 140 then comprises calculating ratios (or, alternatively, calculating differences) among the average absolute value amplitude data for different zones at each depth (step 143). For instance, if the average absolute value amplitude for a hypothetical Zone 1 is 10,000 at a depth of 500 feet and the average absolute value amplitude for a hypothetical Zone 3 is 2,000 at the same depth of 500 feet, the ratio of Zone 1 to Zone 3 at 500 feet is 5. Such ratios between Zone 1 and Zone 3 data may be calculated throughout multiple depths of the wellbore, thereby producing a Zone 1-to-Zone 3 ratio curve for some or all depths of the wellbore. The ratio curve is then plotted (step 144). Such ratio curves may be produced for any combination of zones and is not limited to Zones 1 and 3. Difference curves (i.e., performed by subtracting the average absolute value amplitude data for different zones at a common depth) may be generated and plotted in a similar fashion.

Each ratio curve or difference curve is plotted with one or more companion curves that indicates the ratios or differences between two other zones besides the zones that have already been plotted. For instance, a single ratio plot may contain both a Zone 1-to-Zone 2 ratio curve and a Zone 2-to-Zone 3 ratio curve. Similarly, a single difference plot may contain both a Zone 1-Zone 2 difference curve and a Zone 2-Zone 3 difference curve. Although two curves per plot are preferred, any number of curves may be plotted, as desired. The ratio or difference curves are then analyzed for particular patterns to identify strong or poor cement bonding throughout the depth of the wellbore (step 145).

Figure 17:
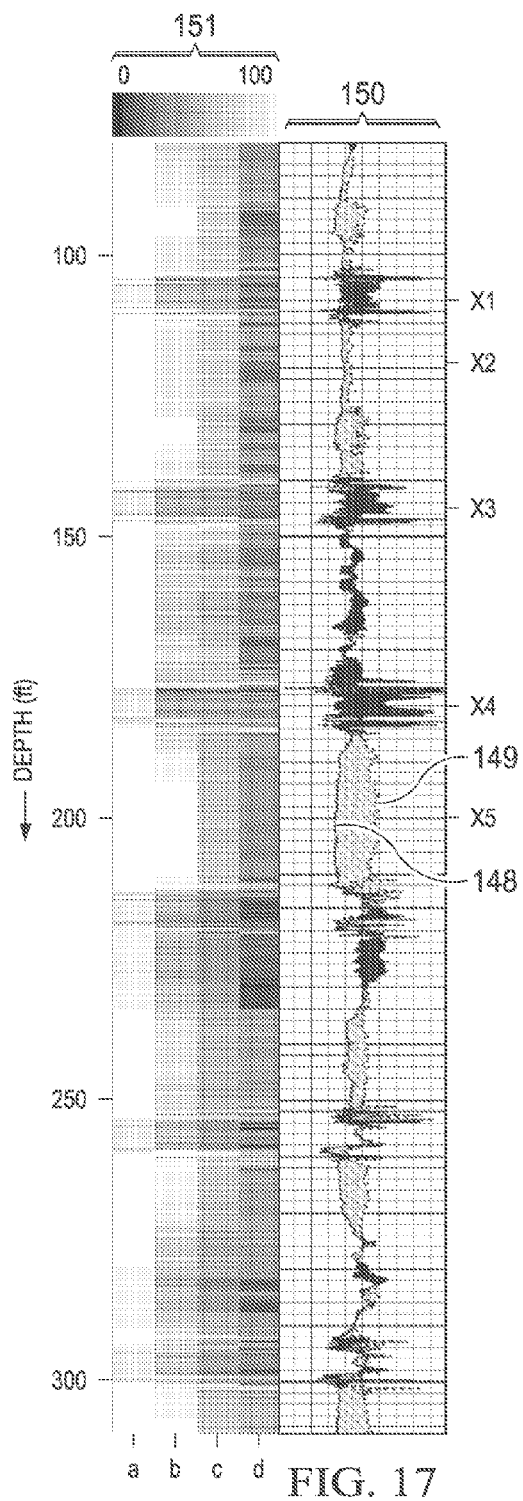
FIG. 17 is a set of amplitude and ratio plots produced by performing the method of FIG. 16, in accordance with embodiments.

FIG. 17 is an illustrative set of amplitude and ratio plots produced by performing the method of FIG. 16 in a hypothetical wellbore environment, in accordance with embodiments. Specifically, FIG. 17 shows a ratio curve plot 150 and an amplitude cement bond log 151. The ratio curve plot 150 includes two ratio curves—a Zone 1-to-Zone 2 curve 148, and a Zone 2-to-Zone 3 curve 149. These curves are plotted as a function of depth along the vertical axis. The log 151 is similar to the logs shown in FIG. 13 in that it shows grayscale-coded average absolute value amplitude data for each of four zones at a plurality of depths. In particular, log 151 comprises sub-logs 151*a*-151*d*, which correspond to hypothetical Zones 1-4, respectively. Comparing the plot 150 to the log 151 in this manner facilitates the initial interpretation of the plot 150. After the behavior of plot 150 is understood by interpreting it in light of log 151, the log 151 is no longer necessary and the plot 150 may be interpreted and used independently of log 151.

The behavior of the ratio curves shown in plot 150 indicates the quality of cement bond present in the annular space behind the second casing string in a multi-string wellbore environment. The determination as to which zone ratios should be calculated and plotted rests at least in part on the bond of Zone 1 (i.e., the inner casing string). If the amplitude curves associated with Zone 1 suggest that Zone 1 is free pipe—i.e., that Zone 1 contains an inner casing string that is not bonded to cement in the annular space adjacent to the string—then ratios from any two zones may typically be used to calculate and plot a ratio curve (and, alternatively, differences from any two zones may typically be used to calculate and plot a difference curve). If, however, the amplitude curves associated with Zone 1 suggest that Zone 1 is bonded to cement, then Zone 1 preferably is not used in ratio or differential calculations.

The ratio curves 148, 149 in plot 150 converge and diverge. In some instances, they converge to the point that they are the same value. As can be seen by comparing the behavior of the ratio curves to the amplitude values in log 151, when the ratio curves diverge from each other at a particular depth, the amplitude values in logs 151*a*-*c* (i.e., Zones 1-3) decrease at that same depth. As explained in detail above, decreasing amplitude values indicate strengthening cement bond. Thus, for instance, at depth x1, the ratio curves are highly divergent, and relatively low amplitudes (indicating strong bond) are seen in Zones 1-3 at the same depth in log 151. At depth x2, the ratio curves sit atop one another and are effectively the same value; at this same depth in log 151, relatively high amplitudes (indicating poor bond) are seen in Zones 1-3. At depths x3-x5, the divergent ratio curves in plot 150 correspond to relatively low amplitudes (and strong bonds) at the same depths in log 151. Depths x1-x5 are selected merely for illustrative purposes. The relationships described between plot 150 and log 151 at depths x1-x5 are generally valid for all depths. The behavior of difference curves is similarly predictive of the cement bond quality at any given depth.

Figure 18:
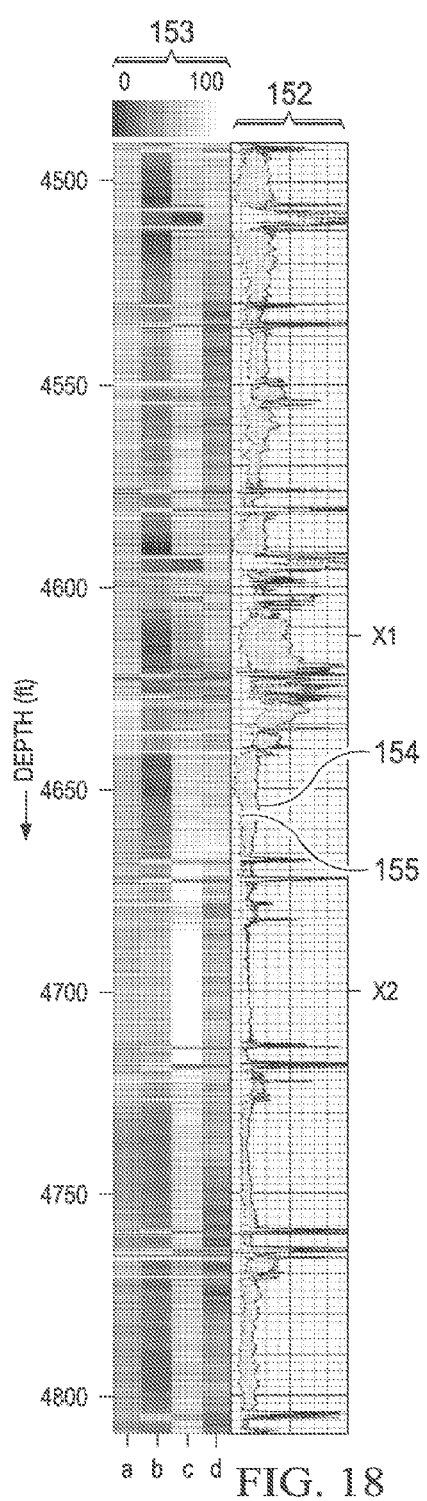
FIG. 18 is another set of amplitude and ratio plots produced by performing the method of FIG. 16, in accordance with embodiments.

FIG. 18 is another illustrative set of amplitude and ratio plots produced by performing the method of FIG. 16 in a hypothetical wellbore environment, in accordance with embodiments. The plot 152 contains two ratio curves—Zone 1-to-Zone 3 curve 154 and Zone 2-to-Zone 3 curve 155. Log 153 contains four sub-logs 153*a*-*d*, which correspond to hypothetical Zones 1-4, respectively. The relationships described above with respect to FIG. 17 are also valid in FIG. 18. Specifically, the more the ratio curves in plot 152 diverge, the lower the amplitudes at the same depth for Zones 1-3 in log 153, thus indicating a strong cement bond at that depth. Similarly, the more the ratio curves in plot 152 converge, the higher the amplitudes at the same depth for Zones 1-3 in log 153, thus indicating poor cement bond at that depth. For instance, at depth x1, the ratio curves diverge significantly. At the same depth in log 153, the grayscale coding indicates low amplitudes and, therefore, strong cement bond. At depth x2, however, the ratio curves have fully converged. Thus, at the same depth in log 153, the grayscale coding indicates high amplitudes and, therefore, a poor cement bond. The behavior of difference curves is similarly predictive of the cement bond quality at any given depth.

Analyzing the behavior of ratio or difference curves in this manner presents multiple advantages. First, an interpreter inspecting a ratio curve plot is able to determine, at a glance, the relative cement bond quality at any given depth. For instance, if an interpreter wishes to identify the depths in a hypothetical wellbore with the poorest cement bonding, he may simply inspect a ratio curve plot—such as plot 150 or 152—and identify the areas where the ratio curves have identical values. Similarly, if the interpreter wishes to identify the depths with the strongest cement bonding, he may identify the depths in the ratio curve plot at which the ratio curves diverge most significantly. This ease-of-use is enhanced by the fact that a ratio curve plot has fewer curves (and is thus easier to read and interpret) than an equivalent amplitude plot, since a single ratio curve is formed using amplitude data from multiple amplitude curves.

Another advantage to the use of ratio or difference curves is that because such curves are inherently relative in nature, they suffer to a lesser degree from environmental conditions that may distort discrete amplitude measurements. More specifically, in some downhole environments containing multiple concentric casing strings, the presence of an inner string (and fluid or cement in the annulus outside the inner string) may interfere with obtaining accurate amplitude values of waves received from a cement sheath outside the second casing string. For instance, analyzing amplitude values from a hypothetical Zone 6 (corresponding to an outer cement sheath) necessarily implicates the use of data that has been subject to interference arising from the inner string. However, when amplitude values from Zone 6 are analyzed relative to values from Zone 4 (by calculating ratios or differences between the two zones), the impact of the interference caused by the inner string (and fluid or cement outside the inner string) is attenuated, because both the data from Zones 4 and the data from Zone 6 have been subject to the same or similar levels of interference. By taking ratios or differences of data from the two zones, the interference effects are dampened.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

The present disclosure encompasses numerous embodiments. At least some of these embodiments are directed to a method for evaluating a cement sheath in a wellbore that comprises transmitting sonic or ultrasonic waves from a logging tool disposed in a wellbore;

receiving reflected waves at the logging tool and recording waveforms based on the received waves; processing the waveforms to determine average absolute value amplitude data for each of a plurality of zones; and determining a number using average absolute value amplitude data for a first of the plurality of zones and average absolute value amplitude data for a second of the plurality of zones. Such embodiments may be supplemented in a variety of ways, including by adding any of the following concepts or steps, in any sequence and in any combination: the number is a ratio or a difference; determining a first set of additional numbers using average absolute value amplitude data for said first of the plurality of zones at multiple depths and average absolute value amplitude data for said second of the plurality of zones at said multiple depths; determining a second set of additional numbers using average absolute value amplitude data for said first of the plurality of zones at said multiple depths and average absolute value amplitude data for a third of the plurality of zones at said multiple depths; plotting said first and second sets of additional numbers on a common plot; analyzing said common plot to identify areas where a first curve for the first set of additional numbers diverges from a second curve for the second set of additional numbers; analyzing said common plot to identify areas where a first curve for the first set of additional numbers converges with a second curve for the second set of additional numbers; comparing said common plot to average absolute value amplitude data plotted on a color-coded, grayscale-coded or intensity-coded log; processing the waveforms to determine average absolute value amplitude data comprises determining said average absolute value amplitude data at minima and maxima of the waveforms; and identifying said minima and maxima of the waveforms by calculating derivatives of the waveforms.

At least some of the embodiments disclosed herein are directed to a method for evaluating a cement sheath in a multi-string wellbore that comprises lowering a logging tool into a wellbore; transmitting sonic or ultrasonic signals from the tool; receiving reflected signals and recording one or more of said signals as a waveform; determining a set of absolute value amplitudes of the waveform at minima and maxima of said waveform; dividing said set of absolute value amplitudes into a plurality of zones; determining a mean absolute value amplitude for each of the plurality of zones; and calculating a number using mean values corresponding to different ones of said zones. Such embodiments may be supplemented in a variety of ways, including by adding any of the following concepts or steps, in any sequence and in any combination: the number is a ratio or a difference; each of the plurality of zones corresponds to a different area of the wellbore; calculating a second number using other mean values that only partially overlap with the mean values used to calculate said number; and plotting said number and said second number on a plot.

At least some of the embodiments disclosed herein are directed to a system for evaluating cement bonding in a wellbore that comprises a logging tool that transmits sonic or ultrasonic waves, receives reflected waves, and records waveforms based on the received waves; and processing logic coupled to the tool that determines a set of mean absolute value amplitudes of a waveform at minima and maxima of said waveform, said mean values divided into different zones, wherein the processing logic determines a number using mean values from multiple of said different zones. Such embodiments may be supplemented in a variety of ways, including by adding any of the following concepts, in any sequence and in any combination: the number comprises either a ratio or a difference; the processing logic further determines an additional number using mean values from any two of said different zones, wherein the processing logic compares the number and the additional number to determine a trait of a cement sheath disposed in said wellbore; and to identify said minima and maxima, the processing logic determines a derivative of said waveform.

What is claimed is:

1. A method for evaluating a cement sheath in a wellbore, comprising:
   transmitting sonic or ultrasonic waves from a logging tool disposed in a wellbore;
   receiving reflected waves at the logging tool and recording waveforms based on the received waves;
   processing the waveforms to determine average absolute value amplitude data for each of a plurality of zones;
   calculating a difference between an average absolute value amplitude data for a first of the plurality of zones and an average absolute value amplitude data for a second of the plurality of zones to get a value; and
   generating a composite image of the cement sheath in the wellbore, wherein the composite image is based at least in part on the difference between the average absolute value amplitude data for the first of the plurality of zones and the average absolute value amplitude data for the second of the plurality of zones.

2. The method of claim 1, further comprising:
   determining a first set of additional values using average absolute value amplitude data for said first of the plurality of zones at multiple depths and average absolute value amplitude data for said second of the plurality of zones at said multiple depths; and
   determining a second set of additional values using average absolute value amplitude data for said first of the plurality of zones at said multiple depths and average absolute value amplitude data for a third of the plurality of zones at said multiple depths.

3. The method of claim 2, further comprising plotting said first and second sets of additional values on a common plot.

4. The method of claim 3, further comprising analyzing said common plot to identify areas where a first curve for the first set of additional values diverges from a second curve for the second set of additional values.

5. The method of claim 3, further comprising analyzing said common plot to identify areas where a first curve for the first set of additional values converges with a second curve for the second set of additional values.

6. The method of claim 3, further comprising comparing said common plot to average absolute value amplitude data plotted on a color-coded, grayscale-coded or intensity-coded log.

7. The method of claim 3, further comprising:
   analyzing said common plot to identify areas where a first curve for the first set of additional values diverges from a second curve for the second set of additional values; and
   analyzing said common plot to identify areas where a first curve for the first set of additional values converges with a second curve for the second set of additional values.

8. The methods of claim 1, wherein processing the waveforms to determine average absolute value amplitude data comprises determining said average absolute value amplitude data at minima and maxima of the waveforms.

9. The method of claim 8, further comprising identifying said minima and maxima of the waveforms by calculating derivatives of the waveforms.

10. A method for evaluating a cement sheath in a multi-string wellbore, comprising:
    lowering a logging tool into a wellbore;
    transmitting sonic or ultrasonic signals from the logging tool;
    receiving reflected signals and recording one or more of said signals as a waveform;
    determining a set of absolute value amplitudes of the waveform at minima and maxima of said waveform;
    dividing said set of absolute value amplitudes into a plurality of zones;
    determining a mean absolute value amplitude for each of the plurality of zones;
    calculating a difference between mean values corresponding to the plurality of zones to get a value; and
    generating a composite image of the cement sheath in the multi-string wellbore, wherein the composite image is based at least in part on the difference between mean values corresponding to the plurality of zones.

11. The methods of claim 10, wherein each of the plurality of zones corresponds to a different area of the wellbore.

12. The methods of claim 10, further comprising calculating a second value using other mean values that only partially overlap with the mean values used to calculate said value.

13. The method of claim 12, further comprising plotting said value and said second value on a plot.

14. A system for evaluating cement bonding in a wellbore, comprising:
    a logging tool that transmits sonic or ultrasonic waves, receives reflected waves, and records waveforms based on the received waves;
    processing logic coupled to the tool that determines a set of mean absolute value amplitudes of a waveform at minima and maxima of said waveform, said mean values divided into different zones,
    wherein the processing logic determines a difference between mean values from said different zones; and
    a cement sheath log, wherein the cement sheath log displays a composite image, wherein the composite image is based at least in part on the difference between mean values from said different zones to get a value.

15. The systems of claim 14, wherein the processing logic further determines an additional value using mean values from any two of said different zones, and wherein the processing logic compares the value and the additional value to determine a trait of a cement sheath disposed in said wellbore.

16. The systems of claim 14, wherein, to identify said minima and maxima, the processing logic determines a derivative of said waveform.

17. The systems of claim 14, wherein the processing logic further determines an additional value using mean values from any two of said different zones, wherein the processing logic compares the value and the additional value to determine a trait of a cement sheath disposed in said wellbore, and wherein, to identify said minima and maxima, the processing logic determines a derivative of said waveform.

* * * * *